US008019776B2

(12) United States Patent
Nagoya

(10) Patent No.: US 8,019,776 B2
(45) Date of Patent: Sep. 13, 2011

(54) DETERMINING DEVICE AND DETERMINING METHOD FOR DETERMINING PROCESSING TO BE PERFORMED BASED ON ACQUIRED DATA

(75) Inventor: Mitsugu Nagoya, Tokyo (JP)

(73) Assignee: Duaxes Corporation, Tokyo (JP)

( * ) Notice: Subject to any disclaimer, the term of this patent is extended or adjusted under 35 U.S.C. 154(b) by 0 days.

(21) Appl. No.: 12/739,887

(22) PCT Filed: Nov. 19, 2007

(86) PCT No.: PCT/JP2007/001257
§ 371 (c)(1),
(2), (4) Date: Aug. 16, 2010

(87) PCT Pub. No.: WO2009/066340
PCT Pub. Date: May 28, 2009

(65) Prior Publication Data
US 2010/0299354 A1     Nov. 25, 2010

(51) Int. Cl.
*G06F 17/30* (2006.01)
*G06F 7/38* (2006.01)
(52) U.S. Cl. ........................................ 707/769; 712/234
(58) Field of Classification Search .................. 707/769; 712/234
See application file for complete search history.

(56) References Cited

U.S. PATENT DOCUMENTS

| | | | | |
|---|---|---|---|---|
| 5,812,998 A * | 9/1998 | Tsutsumi et al. | ...................... | 1/1 |
| 7,099,724 B2 * | 8/2006 | Satake et al. | .................... | 700/90 |
| 2003/0236776 A1 * | 12/2003 | Nishimura et al. | ............... | 707/3 |
| 2008/0294651 A1 * | 11/2008 | Masuyama et al. | ........... | 707/100 |
| 2009/0238344 A1 | 9/2009 | Nagoya | .......................... | 379/45 |

FOREIGN PATENT DOCUMENTS

| | | |
|---|---|---|
| JP | 2004-187201 | 7/2004 |
| JP | 2007-005910 | 1/2007 |
| JP | 2007-243976 | 9/2007 |
| WO | WO 02/084552 * | 10/2002 |
| WO | WO 2006/087832 A1 | 8/2006 |
| WO | WO 2008/004284 A1 | 1/2008 |

OTHER PUBLICATIONS

Klösgen, Willi, et al., "Spatial Subgroup Mining Integrated in an Object Relational Spatial Database", PKDD, LNAI 2431, Springer-Verlag, Berlin, Germany, © 2002, pp. 275-286.*

* cited by examiner

*Primary Examiner* — Robert Stevens
(74) *Attorney, Agent, or Firm* — Ladas & Parry, LLP

(57) ABSTRACT

The present invention provides a technique for determining processing to be performed at high speed. When processing to be performed is determined through multiple condition judgments and branches, a comparison target extraction circuit extracts from acquired data multiple pieces of determination data used for the condition judgments and branches and connects the pieces to generate comparison target data. A first database and a second database store reference data generated by connecting a possible value of each of multiple pieces of determination data and also store a processing content to be performed, in which the reference data and the processing content are related to each other. A binary search circuit collectively conducts multiple condition judgments and branches by searching the first database for comparison target data and outputs a processing content to be performed.

12 Claims, 26 Drawing Sheets

| URL |
|---|
| http://www.xxx.xxx/x5.html |
| http://www.xx.xx/******** |
| ⋮ |

| MATCHED (62) | PERMIT (64) |
|---|---|
| NOT MATCHED | DISCARD |

| (62) | (64) |
|---|---|
| 0 | PERMIT |
| 3 | DISCARD |
| 4 | REPLACEMENT |
| 7 | ROUTING |
| 8 | SWITCHING |
| ⋮ | ⋮ |

| DATA AREA | 1 | 2 | 3 | 4 | 5 | 6 | 7 | 8 | 9 | 10 | ·· |
|---|---|---|---|---|---|---|---|---|---|---|---|
| DATA | A | 0 | K | 0 | E | 2 | F | 0 | G | A | ·· |

| | 50 | 60 |
|---|---|---|
| | ADF | Process a + Process e |
| | ADG | Process a + Process f |
| | AEF | Process a + Process e |
| | AEG | Process a + Process f |
| | BDF | Process b + Process c |
| | BDG | Process b + Process c |
| | BEF | Process b + Process e |
| | BEG | Process b + Process f |
| | CDF | – |
| | CDG | – |
| | CEF | Process d |
| | CEG | Process d | ns
DETERMINING DEVICE AND DETERMINING METHOD FOR DETERMINING PROCESSING TO BE PERFORMED BASED ON ACQUIRED DATA

CROSS-REFERENCE TO RELATED APPLICATIONS

This application is the U.S. National Stage of International Patent Application No. PCT/JP2007/001257 filed on Nov. 19, 2007, the disclosure of which is hereby incorporated by reference in its entirety.

TECHNICAL FIELD

The present invention relates to a technique for determining processing to be performed, and particularly to a determination apparatus and a determination method for determining processing to be performed based on acquired data.

BACKGROUND ART

Due to improved Internet infrastructures and the widespread of communication terminals, such as cellular phone terminals, personal computers, and VoIP (Voice over Internet Protocol) phone sets, the number of Internet users is now exploding. Under such circumstances, security problems such as computer viruses, hacking and spam mails have become apparent, requiring appropriate techniques for communication control.

The Internet has enabled easy access to a vast amount of information. On the other hand, harmful information is proliferating thereon and regulation on its originator does not keep up with the proliferation. To provide an environment where everyone can use the Internet safely and effectively, there is required an appropriate technique for controlling access to harmful contents.

[Patent Document 1] WO 2006-087832

DISCLOSURE OF THE INVENTION

Problem to be Solved by the Invention

The present applicant has proposed a technique for enabling high-speed communication control in Patent Document 1. Aiming to further speed up the operation, the applicant has conceived of another technique for enabling more high-speed communication control.

The present invention has been made in view of such a situation, and a purpose thereof is to provide a technique for determining processing to be performed at high speed.

Means for Solving the Problem

One aspect of the present invention relates to a determination apparatus. The determination apparatus comprises: a comparison target extraction circuit which, when processing to be performed is determined through a plurality of condition judgments and branches, extracts from acquired data a plurality of pieces of determination data used for the condition judgments and branches and connects the plurality of pieces of determination data to generate comparison target data; a database which stores reference data generated by connecting a possible value of each of the plurality of pieces of determination data and also stores a processing content to be performed determined through the plurality of condition judgments and branches based on the combination of the values of the plurality of pieces of determination data included in the reference data, the reference data and the processing content being related to each other; and a search circuit which collectively conducts the plurality of condition judgments and branches by searching the database for the comparison target data and which outputs a processing content to be performed related to the reference data that matches the comparison target data.

When there is a piece of determination data that is not used in the plurality of condition judgments and branches within the combination of the values of the plurality of pieces of determination data included in reference data, the piece of determination data may be masked therein.

Another aspect of the present invention also relates to a determination apparatus. The determination apparatus comprises: a comparison target extraction circuit which, when processing to be performed is determined through a plurality of condition judgments and branches, extracts, from acquired data, comparison target data predefined so as to include a plurality of pieces of determination data used for the condition judgments and branches; a database which stores reference data having a data length identical with that of the comparison target data and containing a possible value of each of the plurality of pieces of determination data at the position of the piece of determination data and which also stores a processing content to be performed determined through the plurality of condition judgments and branches based on the combination of the values of the plurality of pieces of determination data included in the reference data, the reference data and the processing content being related to each other; and a search circuit which collectively conducts the plurality of condition judgments and branches by searching the database for the comparison target data in which each piece of data other than the plurality of pieces of determination data is masked, and which outputs a processing content to be performed related to the reference data that matches the comparison target data.

The determination apparatus may further comprise a comparison target setting circuit which specifies a plurality of pieces of determination data to be extracted by the comparison target extraction circuit. The determination apparatus may comprise a plurality of the databases, and, when changing a plurality of pieces of determination data to be extracted by the comparison target extraction circuit, the comparison target setting circuit may also replace the database searched by the search circuit accordingly.

The determination apparatus may further comprise a reporting circuit which, when the comparison target data does not match any of the reference data, reports the fact. The database may be configured to be updatable from the outside so as to be replaced by a new database in which is added a record in regard to comparison target data that has not matched any of the reference data.

Yet another aspect of the present invention relates to a determination method. The determination method comprises: extracting, when processing to be performed is determined through a plurality of condition judgments and branches, a plurality of pieces of determination data used for the condition judgments and branches from acquired data and connecting the plurality of pieces of determination data to generate comparison target data; and collectively conducting the plurality of condition judgments and branches by searching for the comparison target data within a database, which stores reference data generated by connecting a possible value of each of the plurality of pieces of determination data and also stores a processing content to be performed determined through the plurality of condition judgments and branches based on the combination of the values of the plurality of pieces of determination data included in the reference data, the reference data and the processing content being related to each other, and outputting a processing content to be performed related to the reference data that matches the comparison target data.

When there is a piece of determination data that is not used in the plurality of condition judgments and branches within the combination of the values of the plurality of pieces of determination data included in reference data, the piece of determination data may be masked therein.

Still yet another aspect of the present invention also relates to a determination method. The determination method comprises: extracting, when processing to be performed is determined through a plurality of condition judgments and branches, comparison target data predefined so as to include a plurality of pieces of determination data used for the condition judgments and branches, from acquired data; and collectively conducting the plurality of condition judgments and branches by searching for the comparison target data, in which each piece of data other than the plurality of pieces of determination data is masked, within a database, which stores reference data having a data length identical with that of the comparison target data and containing a possible value of each of the plurality of pieces of determination data at the position of the piece of determination data and which also stores a processing content to be performed determined through the plurality of condition judgments and branches based on the combination of the values of the plurality of pieces of determination data included in the reference data, the reference data and the processing content being related to each other, and outputting a processing content to be performed related to the reference data that matches the comparison target data.

The determination method may further comprise specifying a plurality of pieces of determination data to be extracted in the extracting. In the case where a plurality of the databases are provided and when a plurality of pieces of determination data to be extracted in the extracting are changed, a database to be searched may be also replaced in the specifying accordingly.

The determination method may further comprise reporting, when the comparison target data does not match any of the reference data, the fact. Also, The determination method may further comprise generating, when it is reported that the comparison target data has not matched any of the reference data, a new database in which is added a record in regard to such comparison target data, so as to update the database.

Optional combinations of the aforementioned constituting elements, and implementations of the invention in the form of methods, apparatuses, systems, recording mediums and computer programs may also be practiced as additional modes of the present invention.

Advantageous Effects

The present invention provides a technique for determining processing to be performed at high speed.

BRIEF DESCRIPTION OF THE DRAWINGS

FIG. 7 is a diagram that shows yet another example of the position detection circuit.
FIG. 14 is a diagram that shows still yet another example of internal data of the first database.
FIG. 15 is a diagram that shows an example of internal data of a second database.
FIG. 16 is a diagram that shows another example of internal data of the second database.
FIG. 19 is a diagram that shows an example of communication data acquired by the communication control apparatus.
FIG. 22 is a diagram that shows an example of internal data of the first database and second database according to the embodiment.

Figure 1:
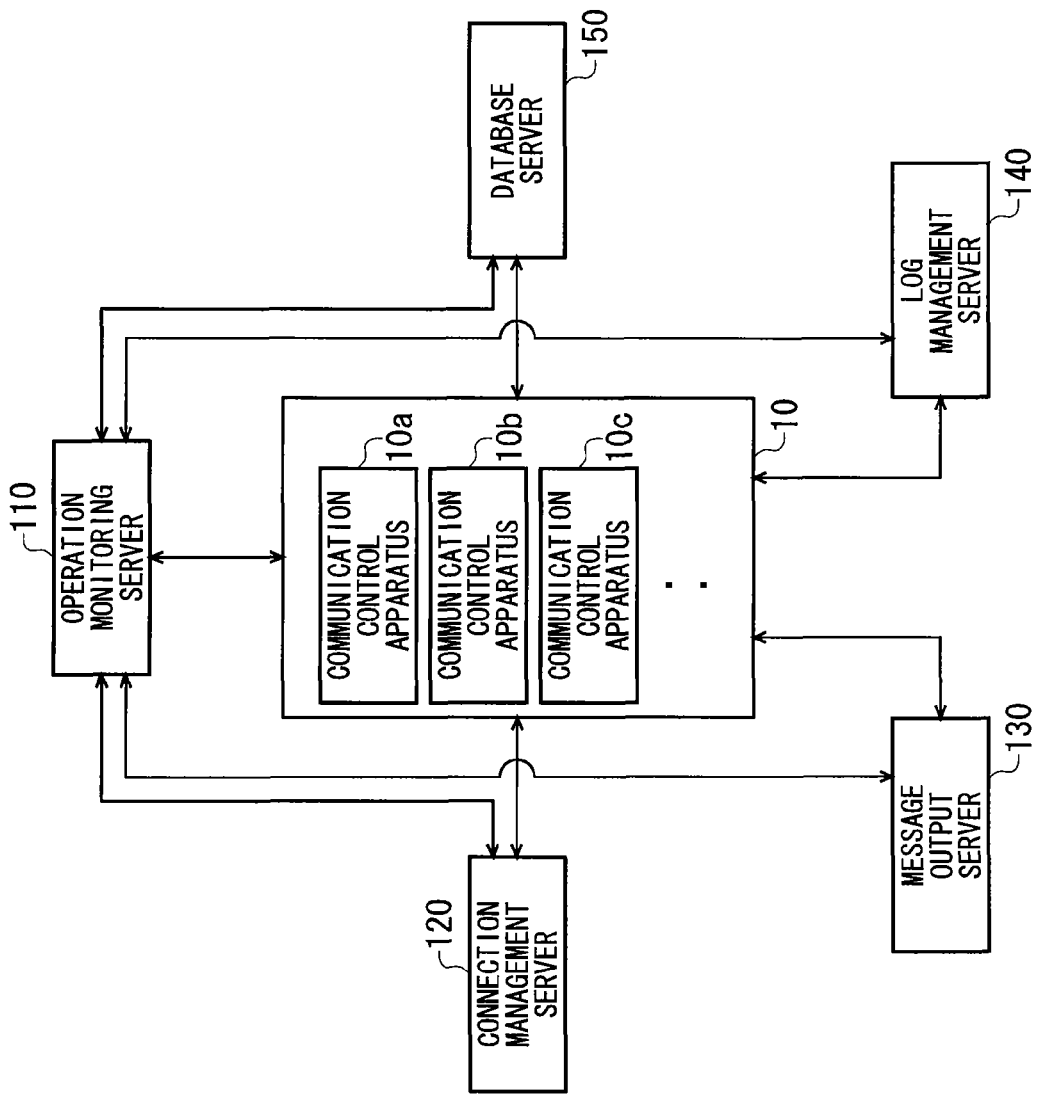
FIG. 1 is a diagram that shows a configuration of a communication control system according to a base technology.

EXPLANATION OF REFERENCE NUMERALS 10 communication control apparatus
20 packet processing circuit
30 search circuit
32 position detection circuit 33 comparison circuit
34 index circuit
35 comparison circuit
36 binary search circuit
36A, 36B and 36C comparison circuits
36Z control circuit
40 process execution circuit
50 first database
60 second database
100 communication control system
110 operation monitoring server
120 connection management server
130 message output server
140 log management server
150 database server
300 comparison target extraction circuit
310 communication data
320 comparison target data
330 comparison target setting circuit
340 reporting circuit

BEST MODE FOR CARRYING OUT THE INVENTION (Base Technology)

First, as a base technology, the configurations and the outline of operation of a communication control apparatus and its peripheral apparatuses will be described.

FIG. 1 shows a configuration of a communication control system according to the base technology. A communication control system 100 comprises a communication control apparatus 10 and various peripheral apparatuses provided to support the operation of the communication control apparatus 10. The communication control apparatus 10 of the base technology performs a packet filtering function provided by an Internet service provider or the like. The communication control apparatus 10 provided on a network path acquires a packet transmitted via the network, analyzes the content, and determines whether or not the packet communication should be permitted. If the communication is permitted, the communication control apparatus 10 will transmit the packet to the network. If the communication is prohibited, the communication control apparatus 10 will discard the packet and return a warning message or the like to the transmission source of the packet if necessary.

The communication control system 100 of the base technology includes multiple communication control apparatuses 10a, 10b, 10c, etc. and operates them functioning as one communication control apparatus 10. Hereinafter, each of the communication control apparatuses 10a, 10b, 10c, etc. and their collective body will be both referred to as a communication control apparatus 10 with no distinction.

In the communication control system 100 of the base technology, each communication control apparatus 10 stores the respective shares of at least part of databases necessary for packet processing; there are provided as many as the number of communication control apparatuses 10 required to share and store such databases, and at least one more apparatus is provided extra. For example, when the number of pieces of data is 300,000 or above but less than 400,000, the number of communication control apparatuses required for operation is four. However, one or more communication control apparatuses 10 should be further provided as standby units in case any of the communication control apparatuses 10 in operation fails or in case a database in any of the communication control apparatuses 10 is updated. Accordingly, at least five communication control apparatuses 10 are provided in total. Conventionally, the entire system has needed to be duplexed considering fault tolerance. According to the technique of the base technology, in contrast, a divided unit of the communication control apparatus 10 may be only provided extra, thereby enabling cost reduction. The operating state of the multiple communication control apparatuses 10a, 10b, 10c, etc. is managed by an operation monitoring server 110. The operation monitoring server 110 of the base technology has a management table for managing the operating state of the communication control apparatuses.

The peripheral apparatuses include the operation monitoring server 110, a connection management server 120, a message output server 130, a log management server 140 and a database server 150. The connection management server 120 manages connection to the communication control apparatus 10. When the communication control apparatus 10 processes a packet transmitted from a cellular phone terminal, for example, the connection management server 120 authenticates the user as a user entitled to enjoy the service of the communication control system 100, based on information included in the packet, which uniquely identifies the cellular phone terminal. Once the user is authenticated, packets transmitted from the IP address, which is temporarily provided for the cellular phone terminal, will be transmitted to the communication control apparatus 10 and processed therein, without being authenticated by the connection management server 120 during a certain period. The message output server 130 outputs a message to the destination or the source of packet transmission, according to whether the communication control apparatus 10 has permitted the packet communication. The log management server 140 manages the operating history of the communication control apparatus 10. The database server 150 acquires the latest database from an external source and provides the database to the communication control apparatus 10. To update the database without halting the operation of the communication control apparatus 10, the apparatus may possess a backup database. The operation monitoring server 110 monitors the operating state of the communication control apparatus 10 and its peripheral apparatuses including the connection management server 120, message output server 130, log management server 140 and database server 150. The operation monitoring server 110 has the highest priority in the communication control system 100 and performs supervisory control of the communication control apparatus 10 and all the peripheral apparatuses. Although the communication control apparatus 10 is configured with a dedicated hardware circuit, as will be described later, the operation monitoring server 110 can monitor the operating state even while the communication control apparatus 10 is in operation, by inputting to or outputting from the communication control apparatus 10 the data for monitoring by means of a boundary-scan circuit based on the technique described in Japanese Patent No. 3041340 filed by the present applicant or other techniques.

In the communication control system 100 of the base technology, as will be described below, the communication control apparatus 10, configured with a dedicated hardware circuit for faster operation, is controlled by using a group of peripheral servers connected thereto and having various functions. Accordingly, by suitably replacing the software of the group of servers, a wide variety of functions can be achieved with a similar configuration. Thus, the base technology provides such communication control system having high flexibility.

Figure 2:
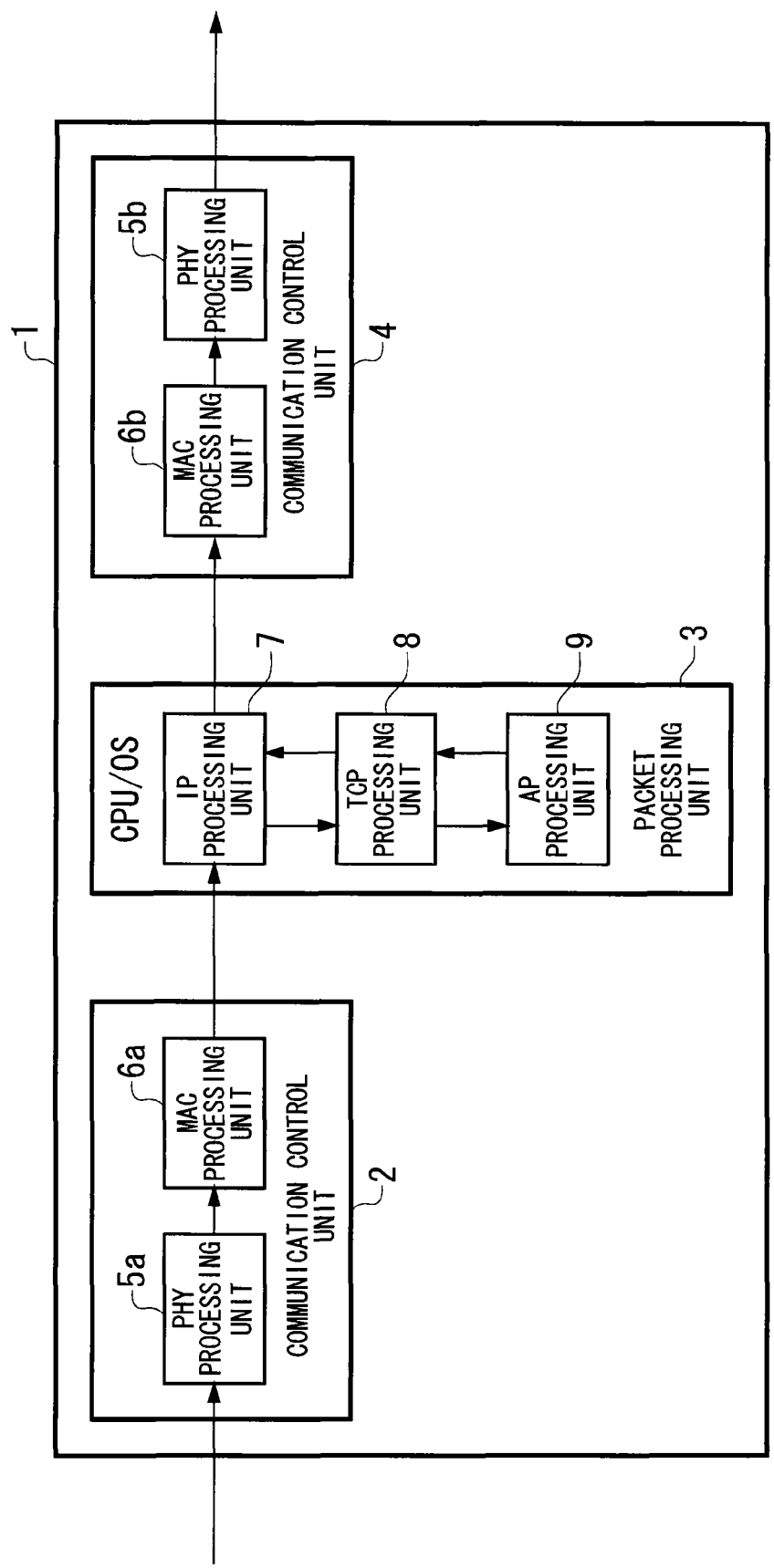
FIG. 2 is a diagram that shows a configuration of a conventional communication control apparatus.

FIG. 2 shows a configuration of a conventional communication control apparatus 1. The conventional communication control apparatus 1 comprises a communication control unit 2 on the receiving side, a packet processing unit 3, and a communication control unit 4 on the sending side. The communication control units 2 and 4 include PHY processing units 5a and 5b for performing physical layer processing of packets, and MAC processing units 6a and 6b for performing MAC layer processing of packets, respectively. The packet processing unit 3 includes protocol processing units for performing protocol-specific processing, such as an IP processing unit 7 for performing IP (Internet Protocol) processing and a TCP processing unit 8 for performing TCP (Transport Control Protocol) processing. The packet processing unit 3 also includes an AP processing unit 9 for performing application layer processing. The AP processing unit 9 performs filtering or other processing according to data included in a packet.

The packet processing unit 3 of the conventional communication control apparatus 1 is implemented by software, using a general-purpose processor, or CPU, and an OS running on the CPU. With such configuration, however, the performance of the communication control apparatus 1 depends on the performance of the CPU, hampering the creation of a communication control apparatus capable of high-speed processing of a large volume of packets. For example, a 64-bit CPU can process only up to 64 bits at a time, and hence, there has existed no communication control apparatus having a higher performance than this. In addition, since the conventional communication control apparatus is predicated on the presence of an OS with versatile functionality, the possibility of security holes cannot be eliminated completely, requiring maintenance work including OS upgrades.

Figure 3:
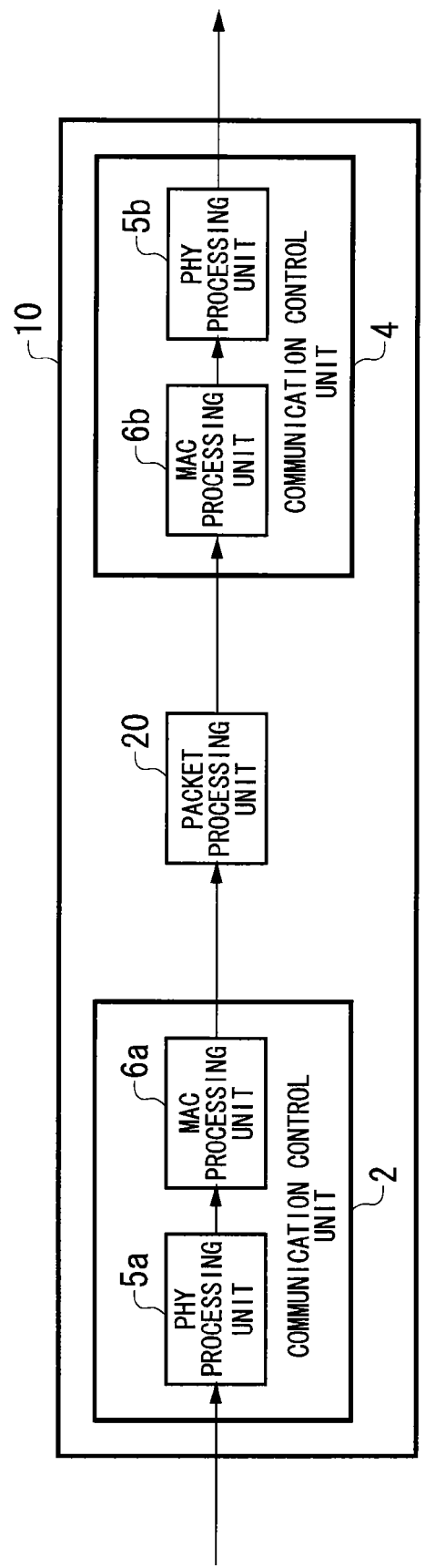
FIG. 3 is a diagram that shows a configuration of a communication control apparatus according to the base technology.

FIG. 3 shows a configuration of a communication control apparatus according to the base technology. A communication control apparatus 10 of the base technology comprises a packet processing circuit 20 configured with dedicated hardware employing a wired logic circuit, instead of a packet processing unit that is implemented by software including a CPU and an OS in a conventional communication control apparatus. By providing a dedicated hardware circuit to process communication data, rather than processing it with an OS and software running on a general-purpose processing circuit such as CPU, the performance limitations posed by the CPU or OS can be overcome, enabling a communication control apparatus having high throughput.

For example, a case will be considered here in which search is conducted in packet filtering or the like to check if the data in a packet includes reference data, which serves as a criterion for filtering. When a CPU is used to compare the communication data with the reference data, there occurs a problem in that, since only 64-bit data can be compared at a time, the processing speed cannot be improved beyond such CPU performance. Since the CPU needs to repeat the process of loading 64 bits of communication data into a memory and comparing it with the reference data, the memory load time becomes a bottleneck that limits the processing speed.

In the base technology, by contrast, a dedicated hardware circuit configured with a wired logic circuit is provided to compare communication data with reference data.

This circuit includes multiple comparators arranged in parallel, so as to enable the comparison of data having a length greater than 64 bits, such as 1024 bits. By providing dedicated hardware in such manner, bit matching can be simultaneously performed on a large number of bits in parallel. Since 1024-bit data can be processed at a time, while the conventional communication control apparatus 1 using a CPU processes only 64 bits, the processing speed can be improved remarkably. Increasing the number of comparators will improve the throughput, but also increase the cost and size of the apparatus. Accordingly, an optimal hardware circuit may be designed in accordance with the desired performance, cost or size.

Since the communication control apparatus 10 of the base technology is configured with dedicated hardware employing a wired logic circuit, it does not require any OS (Operating System). This can eliminate the need for the installation, bug fixes, or version upgrades of an OS, thereby reducing the cost and man-hours required for administration and maintenance. Also, unlike CPUs requiring versatile functionality, the communication control apparatus 10 does not include any unnecessary functions or use needless resources, and hence, reduced cost, a smaller circuit area or improved processing speed can be expected. Furthermore, again unlike conventional OS-based communication control apparatuses, the absence of unnecessary functions decreases the possibility of security holes and thus enhances the tolerance against attacks from malicious third parties over a network.

The conventional communication control apparatus 1 processes packets using software predicated on a CPU and an OS. Therefore, all packet data needs to be received before protocol processing is performed, and then the data is passed to an application. In contrast, since packet processing is performed by a dedicated hardware circuit in the communication control apparatus 10 of the base technology, all packet data need not be received before starting the processing; upon reception of necessary data, the processing can be started at any given point in time without waiting for the reception of subsequent data. For example, position detection processing in a position detection circuit, which will be described later, may be started at the time when position identification data for identifying the position of comparison target data is received. Thus, various types of processing can be performed in parallel without waiting for the reception of all data, reducing the time required to process packet data.

Figure 4:
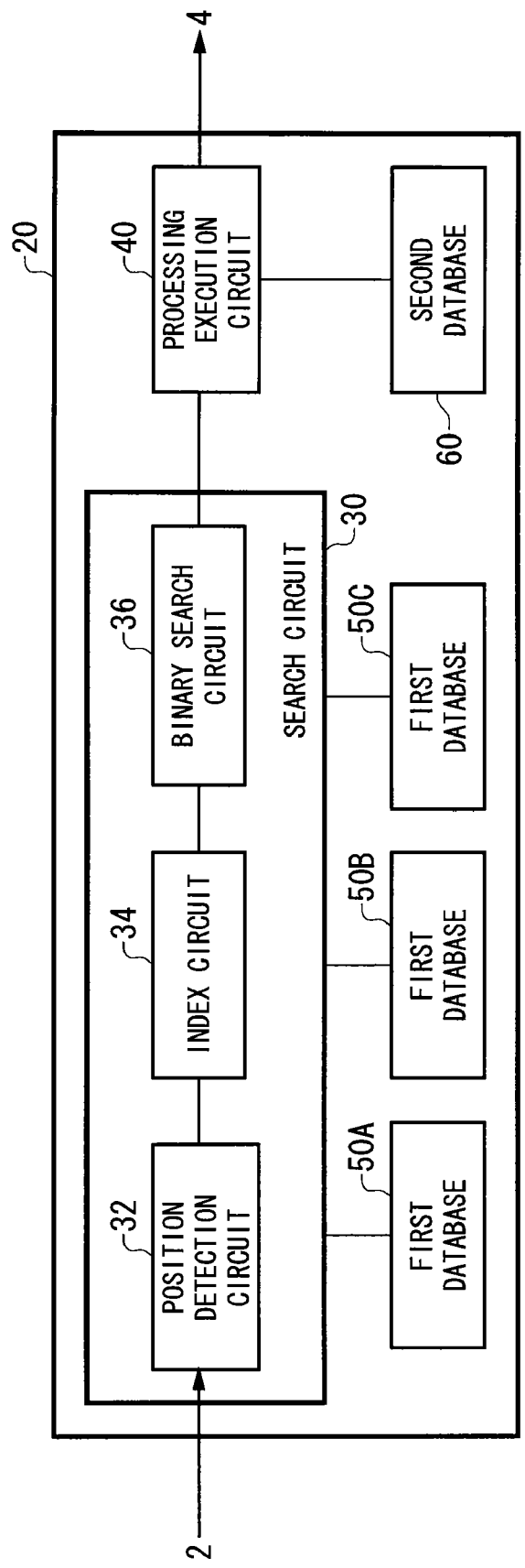
FIG. 4 is a diagram that shows a configuration of a packet processing circuit.

FIG. 4 shows an internal configuration of the packet processing circuit. The packet processing circuit 20 comprises: first databases 50A, 50B and 50C (hereinafter, they may be collectively referred to as "first databases 50") for storing reference data, which is referred to when processing to be performed on communication data is determined; a search circuit 30 for searching received communication data for the reference data by comparing the two; a second database 60 for storing a search result of the search circuit 30 and a content of processing to be performed on the communication data, which are related to each other; and a process execution circuit 40 for processing the communication data based on the search result of the search circuit 30 and the conditions stored in the second database 60.

The search circuit 30 includes: a position detection circuit 32 for detecting the position of comparison target data, which is to be compared with reference data, in communication data; an index circuit 34 which serves as an example of a determination circuit that determines which range the comparison target data belongs to among three or more ranges, into which the reference data stored in the first database 50 is divided; and a binary search circuit 36 for searching the determined range for the reference data that matches the comparison target data. The reference data may be searched for the comparison target data using any search technique, and a binary search method is used in the base technology. Since an improved binary search method is employed, as will be discussed later, three first databases 50 are provided in the base technology. The first databases 50A, 50B and 50C store the same reference data.

Figure 5:
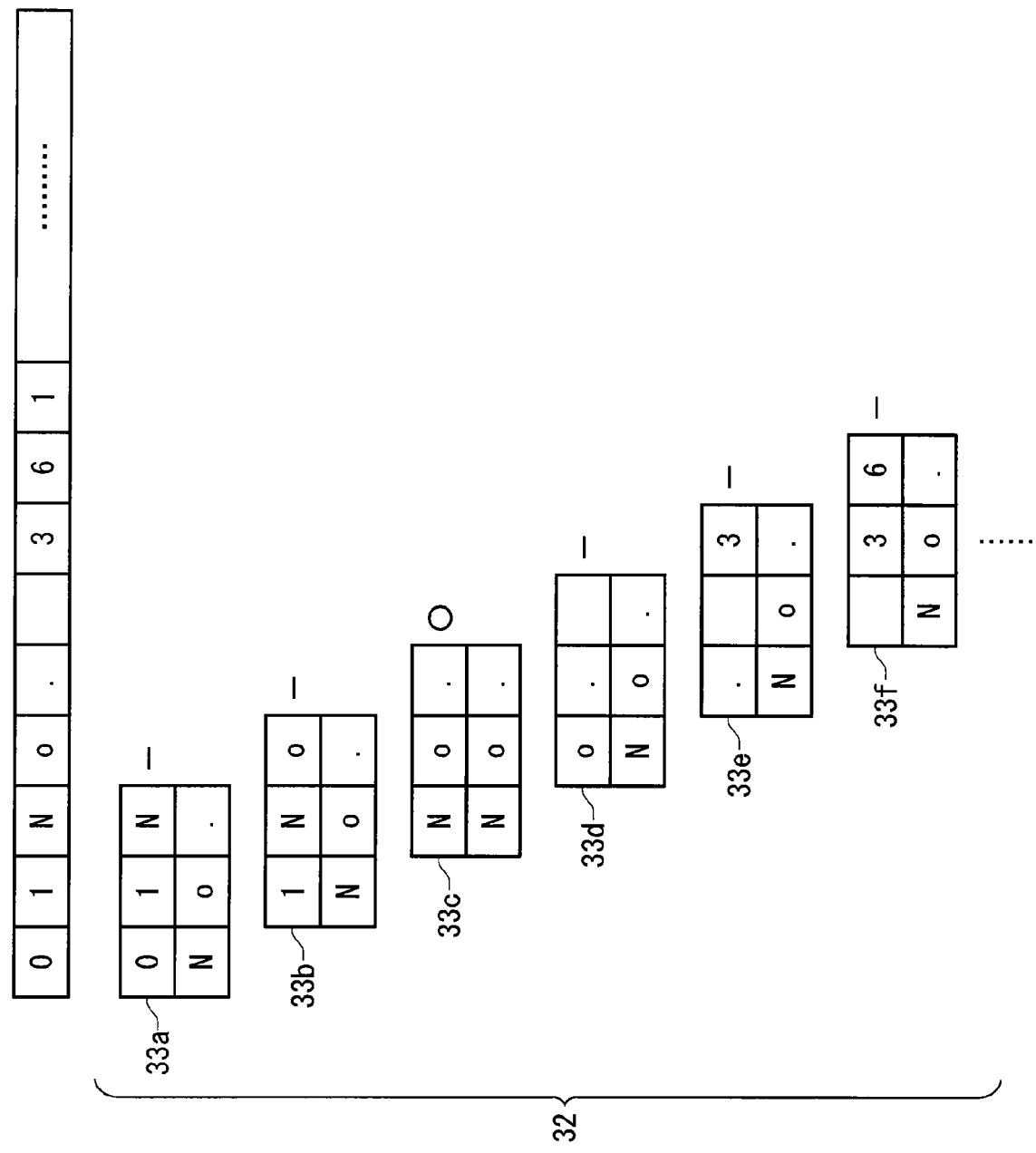
FIG. 5 is a diagram that shows a configuration of a position detection circuit.

FIG. 5 shows an internal configuration of the position detection circuit. The position detection circuit 32 includes multiple comparison circuits 33a-33f that compare communication data with position identification data for identifying the position of comparison target data. While six comparison circuits 33a-33f are provided here, the number of comparison circuits may be arbitrary, as will be described later. To the comparison circuits 33a-33f are input pieces of communication data, with each piece shifted from the preceding one by a predetermined data length, such as 1 byte. These multiple comparison circuits 33a-33f then simultaneously compare the respective communication data with the position identification data to be detected in parallel.

The base technology will be described by way of example for explaining the operation of the communication control apparatus 10, in which a character string "No. ###" in communication data is detected, the number "###" included in the character string is then compared with reference data, and if the number matches the reference data, the packet will be allowed to pass, while, if they do not match, the packet will be discarded.

In the example of FIG. 5, communication data "01No. 361 ..." is input to the comparison circuits 33a-33f with a shift of one character each, and position identification data "No." for identifying the position of the number "###" is sought to be detected in the communication data. More specifically, "01N" is input to the comparison circuit 33a, "1No" to the comparison circuit 33b, "No." to the comparison circuit 33c, "o." to the comparison circuit 33d, ". 3" to the comparison circuit 33e, and "36" to the comparison circuit 33f. Then, the comparison circuits 33a-33f simultaneously perform comparisons with the position identification data "No.". Consequently, there is found a match with the comparison circuit 33c, indicating that the character string "No." exists at the third character from the top of the communication data. Thus, it is found that the numeral data as comparison target data exists subsequent to the position identification data "No." detected by the position detection circuit 32.

When the same processing is performed by a CPU, since the comparison process needs to be serially performed one by one from the top, such as comparing character strings "01N" and "No." before comparing "1No" and "No.", no improvement of detection speed can be expected. In the communication control apparatus 10 of the base technology, in contrast, providing the multiple comparison circuits 33a-33f in parallel enables simultaneous parallel comparison processing, which could not have been performed with a CPU, improving the processing speed significantly. Providing more comparison circuits will improve the detection speed, as more characters can be compared simultaneously. In consideration of cost or size, a sufficient number of comparison circuits may be provided to achieve a desired detection speed.

Aside from detecting position identification data, the position detection circuit 32 may also be used as a circuit for detecting character strings for various purposes. Moreover, the position detection circuit 32 may be configured to detect position identification data in units of bits, not just as a character string.

Figure 6:
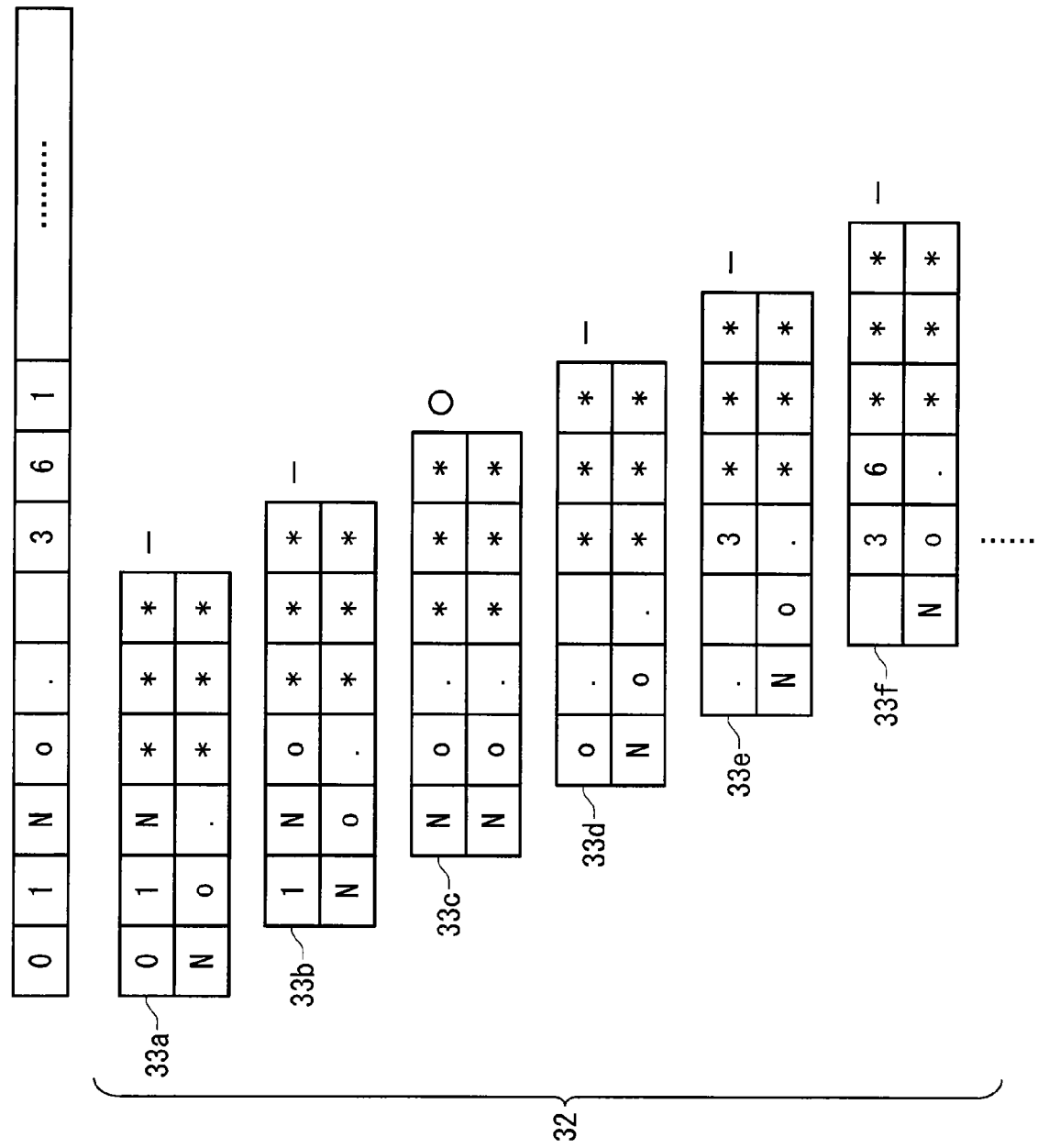
FIG. 6 is a diagram that shows another example of the position detection circuit.

FIG. 6 shows another example of the position detection circuit. In the example shown in FIG. 6, when the data length of position identification data is shorter than that prepared in each of the comparison circuits 33a-33f in the position detection circuit 32, the remaining positions are padded with predetermined data, such as "00H" or "01H", posterior to the position identification data. Similarly, with regard to communication data to be compared with position identification data, a data length identical with that of the position identification data is extracted from the communication data and input to a comparison circuit, and the remaining positions posterior to the extracted data are padded with the same data as used for the padding in the position identification data. In such case, the communication data may be copied as work, and the copied data may be processed to be input to the comparison circuits 33a-33f, so as not to change the original communication data. Thus, the position detection circuit 32 can be generally used regardless of the length of position identification data.

Figure 7:
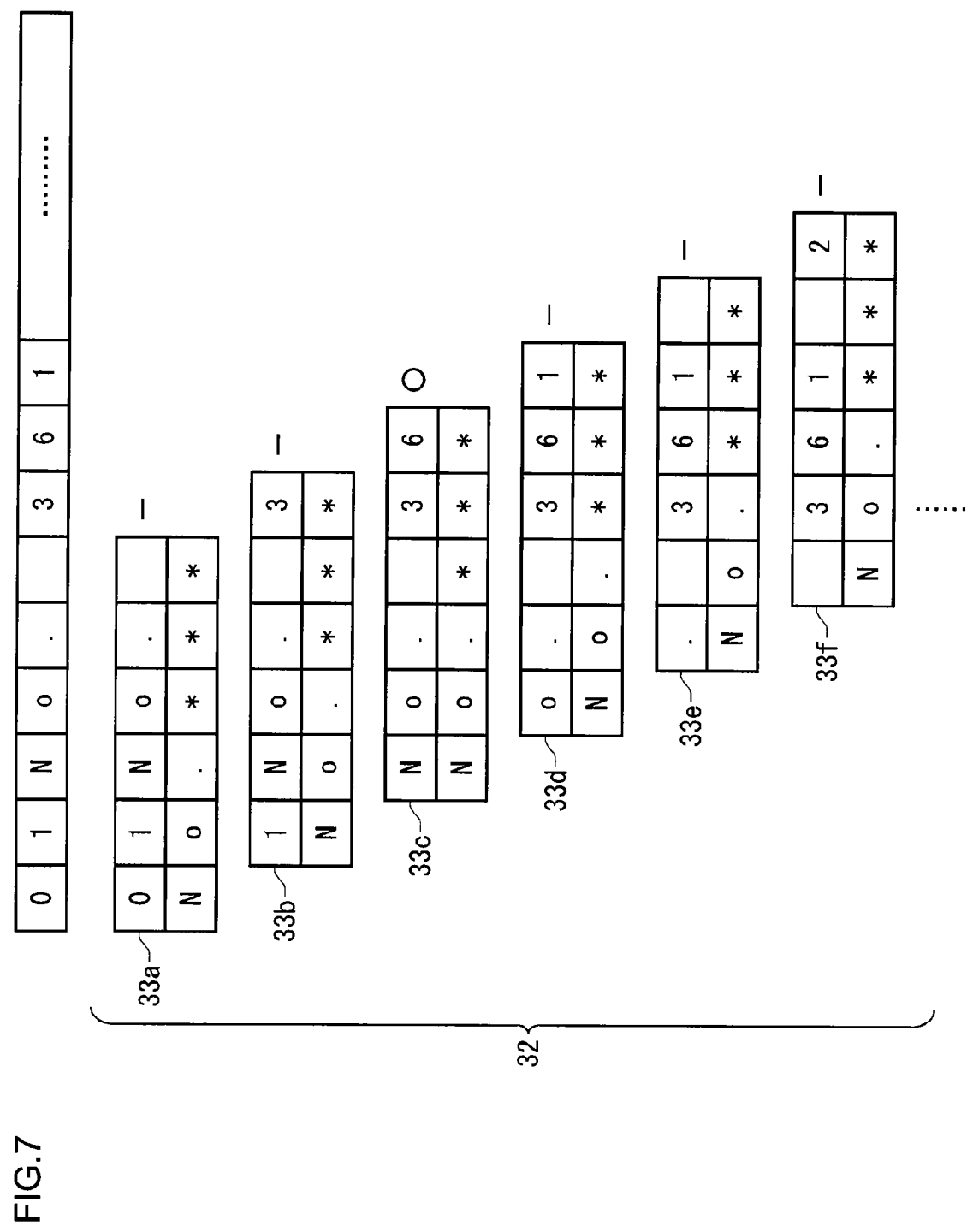

FIG. 7 shows yet another example of the position detection circuit. In the example shown in FIG. 7, the remaining positions posterior to position identification data are padded with predetermined data in the same way as shown in the example of FIG. 6, and, in addition, such data is regarded as a wild card. That is, when data is input as a wild card into the comparison circuits 33a-33f, it is determined that the corresponding part of target data to be compared matches the wild-card data whatever the target data is. Thus, the position detection circuit 32 can be generally used regardless of the length of position identification data.

Figure 8:
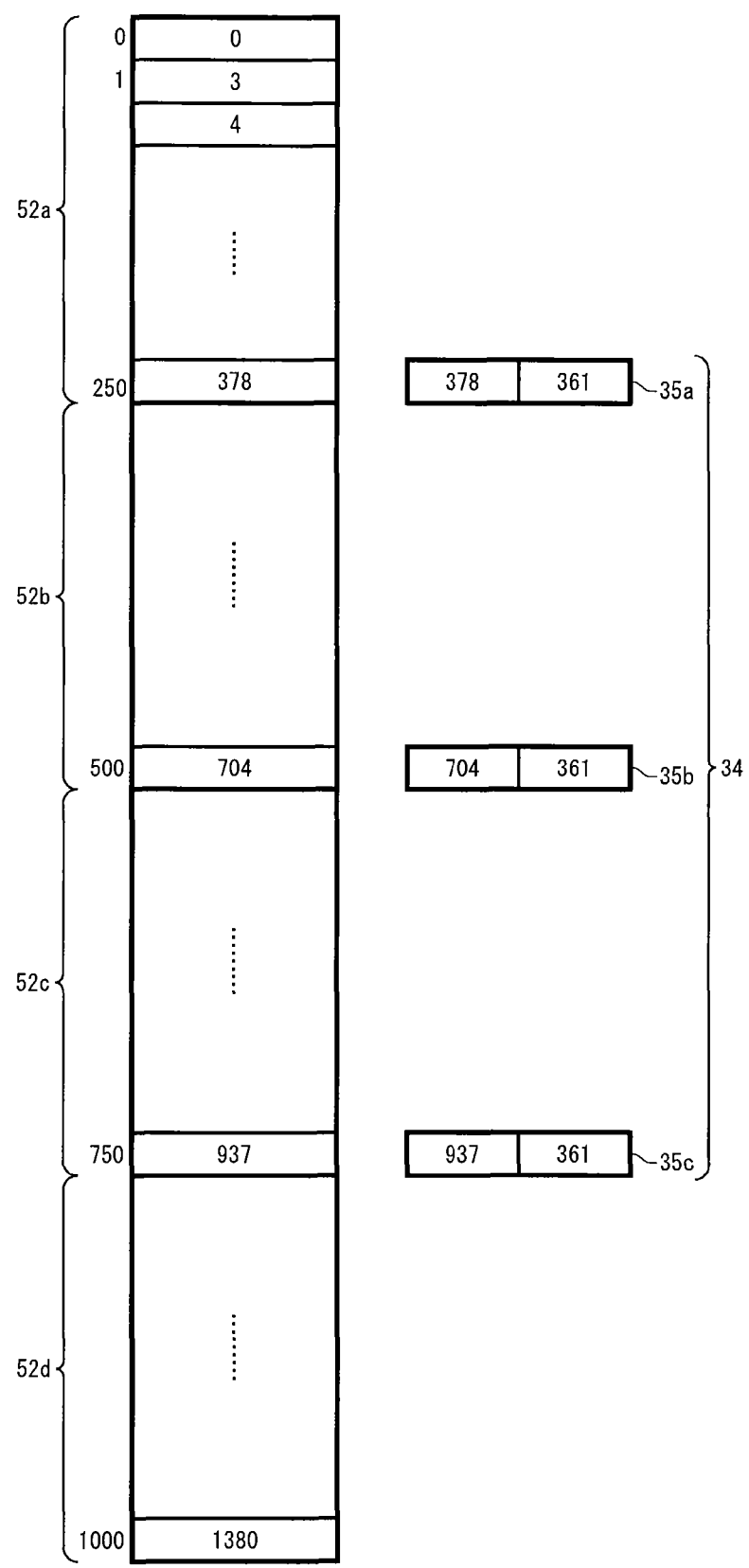
FIG. 8 is a diagram that shows an example of internal data of a first database.

FIG. 8 shows an example of internal data of the first database. The first database 50 stores reference data, which is referred to when processing on packets, such as filtering, routing, switching, or replacement, is determined. The pieces of reference data are sorted according to some sort conditions and stored in ascending or descending order. In the example of FIG. 8, 1000 pieces of reference data are stored.

The index circuit 34 determines which range comparison target data belongs to among three or more ranges, such as 52a-52d, into which reference data stored in the first database 50 is divided. In the example of FIG. 8, the 1000 pieces of reference data are divided into four ranges 52a-52d, i.e., 250 pieces each in a range. The index circuit 34 includes multiple comparison circuits 35a-35c, each of which compares a piece of reference data at the border of the range with the comparison target data. Since the comparison circuits 35a-35c simultaneously compare the pieces of reference data at the borders with the comparison target data in parallel, which range the comparison target data belongs to can be determined by a single operation of comparison processing.

The pieces of reference data at the borders to be input to the comparison circuits 35a-35c of the index circuit 34 may be set by an apparatus provided outside the communication control apparatus 10. Alternatively, reference data at predetermined positions in the first database 50 may be set in advance to be automatically input as such. In the latter case, even when the first database 50 is updated, the reference data at the predetermined positions in the first database 50 are automatically input to the comparison circuits 35a-35c. Therefore, the communication control processing can be performed immediately without initialization or the like.

As mentioned previously, CPU-based binary search cannot make multiple comparisons at the same time. In the communication control apparatus 10 of the base technology, in contrast, providing the multiple comparison circuits 35a-35c in parallel enables simultaneous parallel comparison processing, with a significant improvement in the search speed.

After the index circuit 34 determines the relevant range, the binary search circuit 36 performs search using a binary search method. The binary search circuit 36 divides the range determined by the index circuit 34 further into $2^n$ and subsequently compares the pieces of reference data lying at the borders with the comparison target data, thereby determining which range the comparison target data belongs to. The binary search circuit 36 includes multiple comparators for comparing, bit by bit, reference data with comparison target data. For example, in the base technology are provided 1024 comparators to perform bit matching on 1024 bits simultaneously.

When the range to which the comparison target data belongs is determined among the $2^n$ split ranges, the determined range is further divided into $2^n$. Then, the pieces of reference data lying at the borders are read out to be compared with the comparison target data. Thereafter, this processing is repeated to narrow the range further until reference data that matches the comparison target data is eventually found.

The operation will now be described in more detail in conjunction with the foregoing example. Each of the comparison circuits 35a-35c of the index circuit 34 receives "361" as comparison target data. As for reference data, the comparison circuit 35a receives "378", which lies at the border of the ranges 52a and 52b. Similarly, the comparison circuit 35b receives reference data "704" lying at the border of the ranges 52b and 52c, and the comparison circuit 35c receives reference data "937" lying at the border of the ranges 52c and 52d. The comparison circuits 35a-35c then perform comparisons simultaneously, determining that the comparison target data "361" belongs to the range 52a. Subsequently, the binary search circuit 36 searches the reference data for the comparison target data "361".

Figure 9:
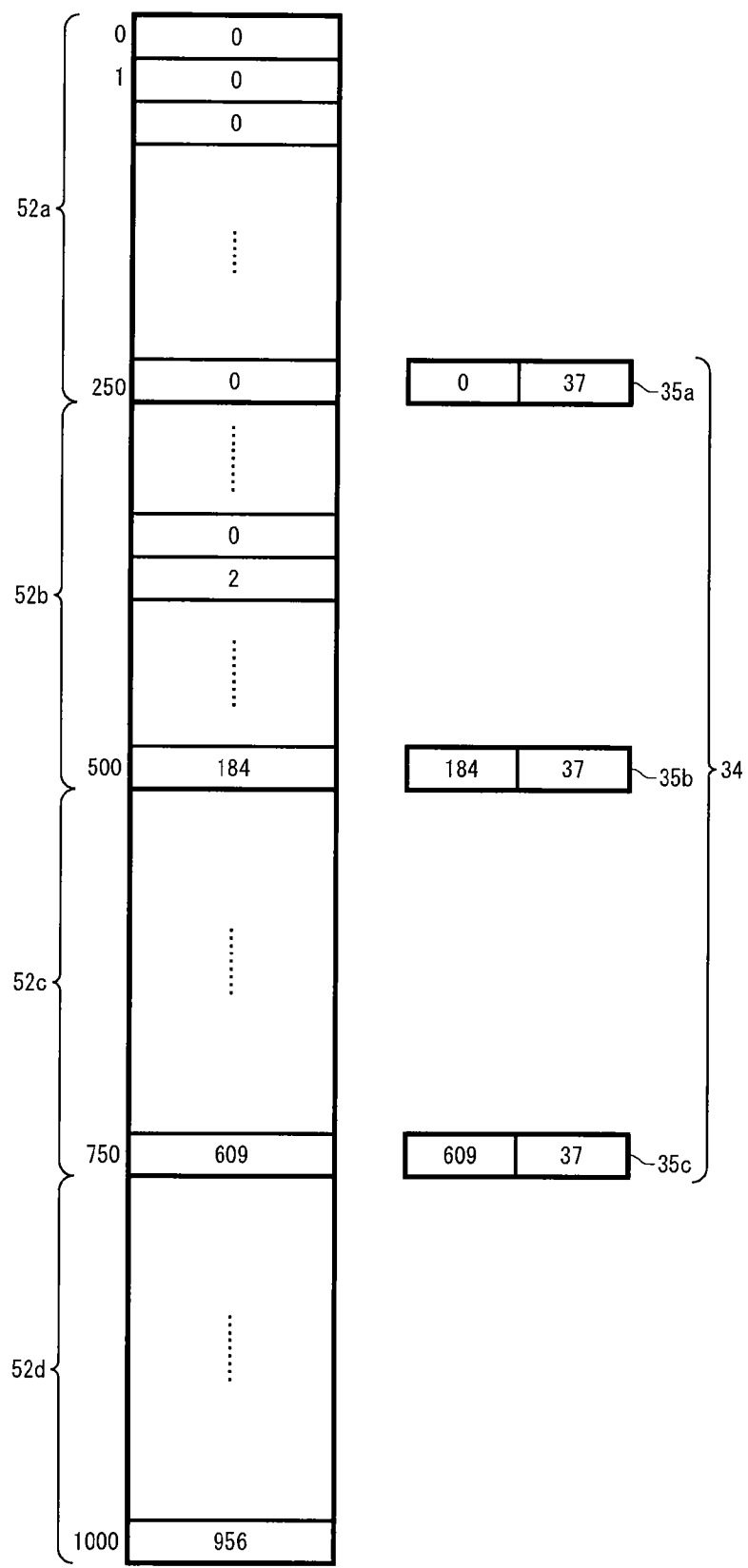
FIG. 9 is a diagram that shows another example of internal data of the first database.

FIG. 9 shows another example of internal data of the first database. In the example shown in FIG. 9, the number of pieces of reference data is smaller than the number of pieces of data storable in the first database 50, i.e., 1000 in this case. In such instance, the first database 50 stores the pieces of reference data in descending order, starting with the last data position therein. Then, 0 is stored in the rest of the data positions. The database is loaded with data not from the top but from the bottom of the loading area, and all the vacancies occurring in the front of the loading area, if any, are replaced with zero. Consequently, the database is fully loaded at any time, so that the search time necessary for a binary search will be constant. Moreover, if the binary search circuit 36 reads reference data "0" during a search, the circuit can identify the range without making a comparison, as the comparison result is obvious, and can proceed to the next comparison. Consequently, the search speed can be improved.

In CPU-based software processing, the first database 50 stores pieces of reference data in ascending order, from the first data position therein. In the rest of data positions will be stored a maximum value or the like, and in such case, the skip of comparison processing as described above cannot be made during a binary search. The comparison technique described above can be implemented by configuring the search circuit 30 with a dedicated hardware circuit.

Figure 10:
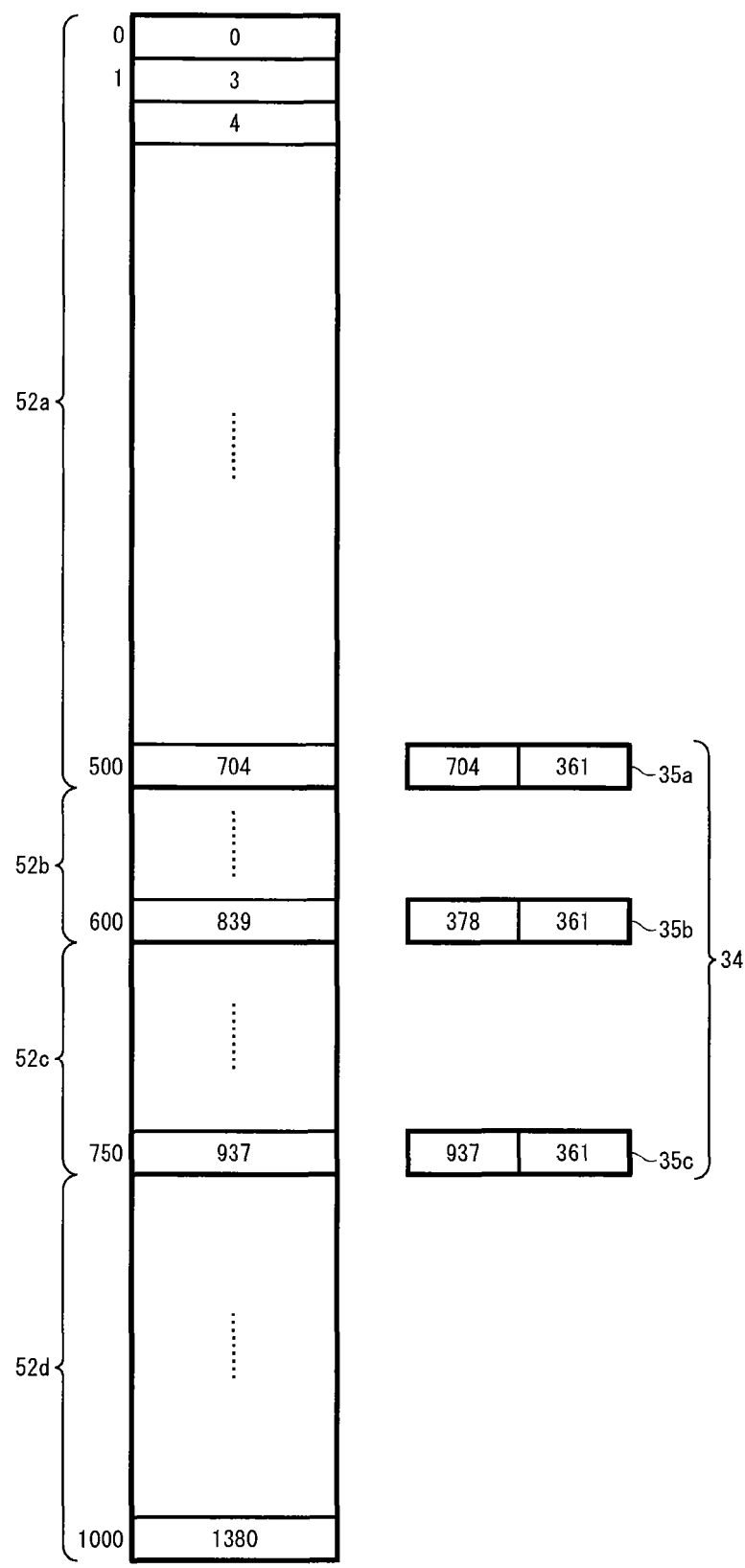
FIG. 10 is a diagram that shows yet another example of internal data of the first database.

FIG. 10 shows yet another example of internal data of the first database. In the example shown in FIG. 10, the reference data is not evenly divided into three or more ranges, but unevenly divided into ranges that accommodate different numbers of pieces of data, such as 500 pieces in the range 52a and 100 pieces in the range 52b. These ranges may be determined depending on the distribution of frequencies with which reference data occurs in communication data. Specifically, the ranges may be determined so that the sums of the frequencies of occurrence of reference data belonging to the respective ranges are almost the same. Accordingly, the search efficiency can be improved. The reference data to be input to the comparison circuits 35a-35c of the index circuit 34 may be modifiable from the outside. In such case, the ranges can be dynamically set, so that the search efficiency will be optimized.

Figure 11:
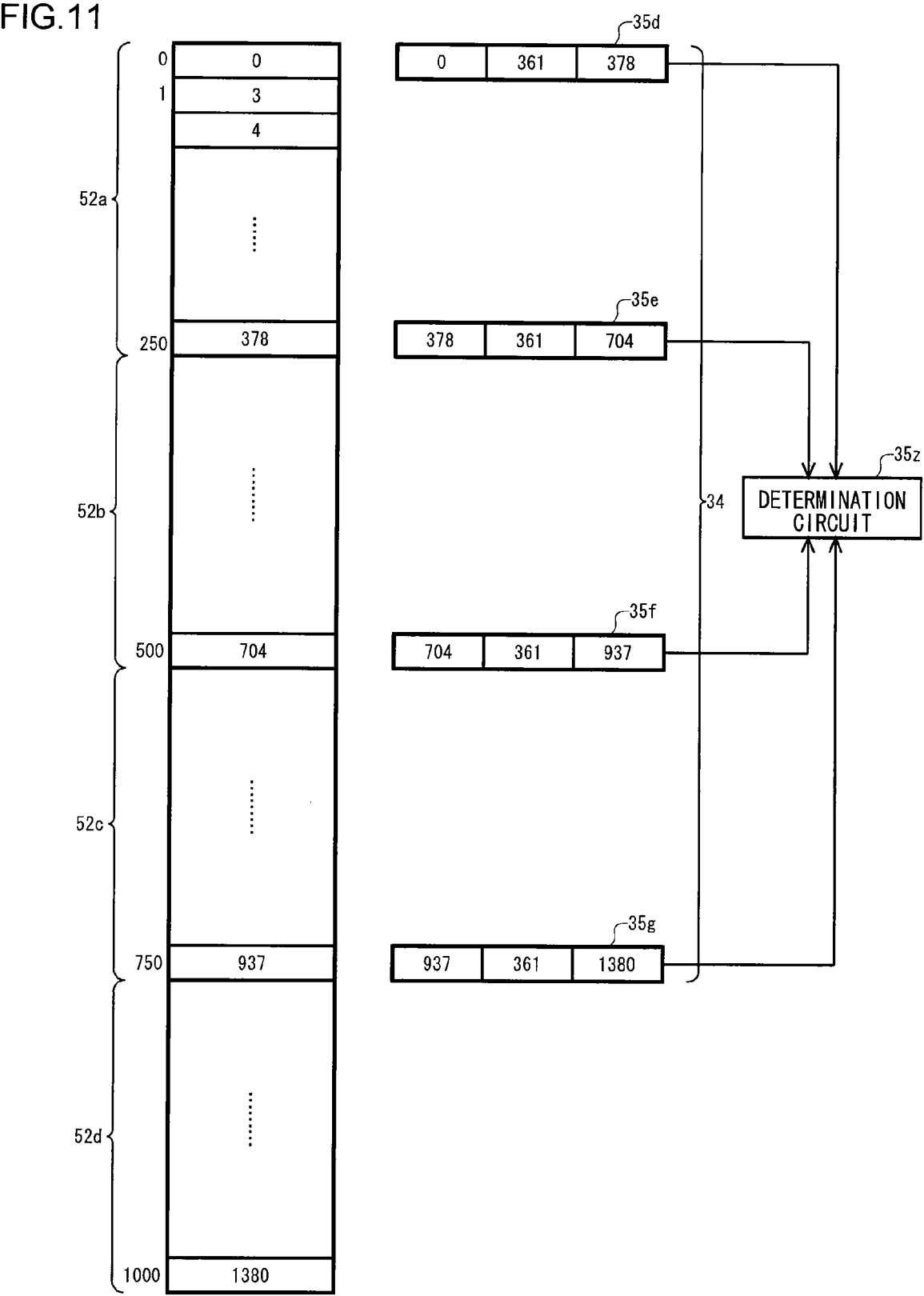
FIG. 11 is a diagram that shows another example of the index circuit.

FIG. 11 shows another example of the index circuit. In the examples of FIGS. 8-10, the index circuit 34 uses the three comparison circuits 35a-35c to determine which range comparison target data belongs to among the four ranges of 52a-52d in the first database 50. In the example shown in FIG. 11, on the other hand, the index circuit 34 is provided with four comparison circuits 35d-35g for determining whether or not comparison target data is included in each of the four ranges 52a-52d. For example, into the comparison circuit 35d are input the 0th and 250th pieces of reference data in the first database 50 and comparison target data. Then, each piece of the reference data is compared to the comparison target data, so as to determine whether or not the reference data is included in the range 52a. The comparison results provided by the comparison circuits 35d-35g are input into a determination circuit 35z, which outputs information providing which range the reference data is included in. Each of the comparison circuits 35d-35g may output a result indicating whether the reference data is included between the two input pieces of reference data, or may output a result indicating that the reference data is greater than the range, the reference data is included in the range, or the reference data is smaller than the range. When it is determined that the comparison target data is not included in any of the ranges 52a-52d, it can be found that the comparison target data does not exist within the first database 50. Accordingly, the search can be terminated without performing any further binary search.

Figure 12:
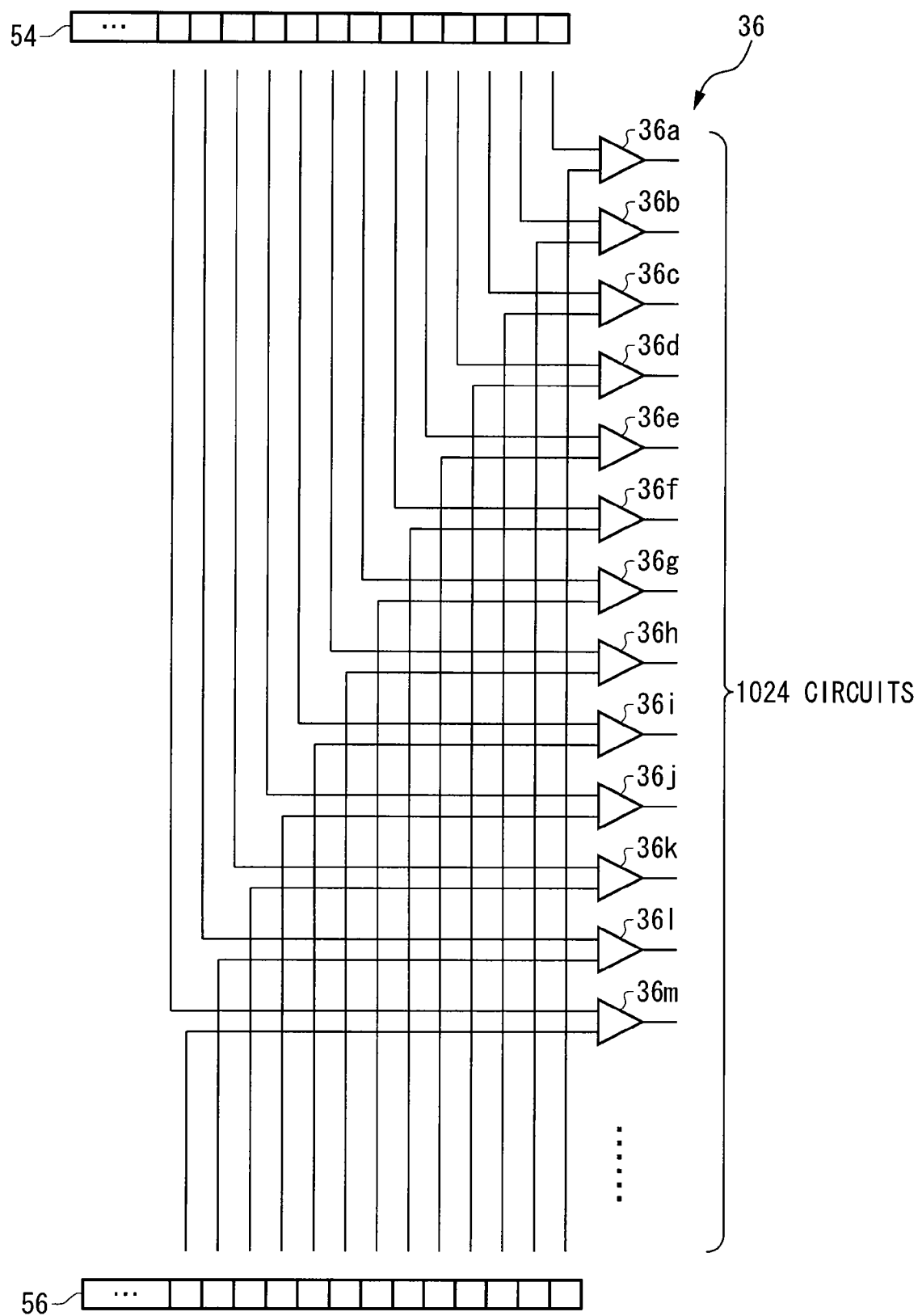
FIG. 12 is a diagram that shows a configuration of a comparison circuit included in a binary search circuit.

FIG. 12 shows a configuration of a comparison circuit included in the binary search circuit. As mentioned previously, a comparison circuit in the binary search circuit 36 includes 1024 comparators, such as 36a, 36b, . . . . Each of the comparators 36a, 36b, etc. receives 1 bit of reference data 54 and 1 bit of comparison target data 56 to compare the bits in value. The comparison circuits 35a-35c of the index circuit 34 have similar internal configurations. Since the comparison processing is thus performed by a dedicated hardware circuit, a large number of comparison circuits can be operated in parallel to compare a large number of bits at a time, thereby speeding up the comparison processing.

Figure 13:
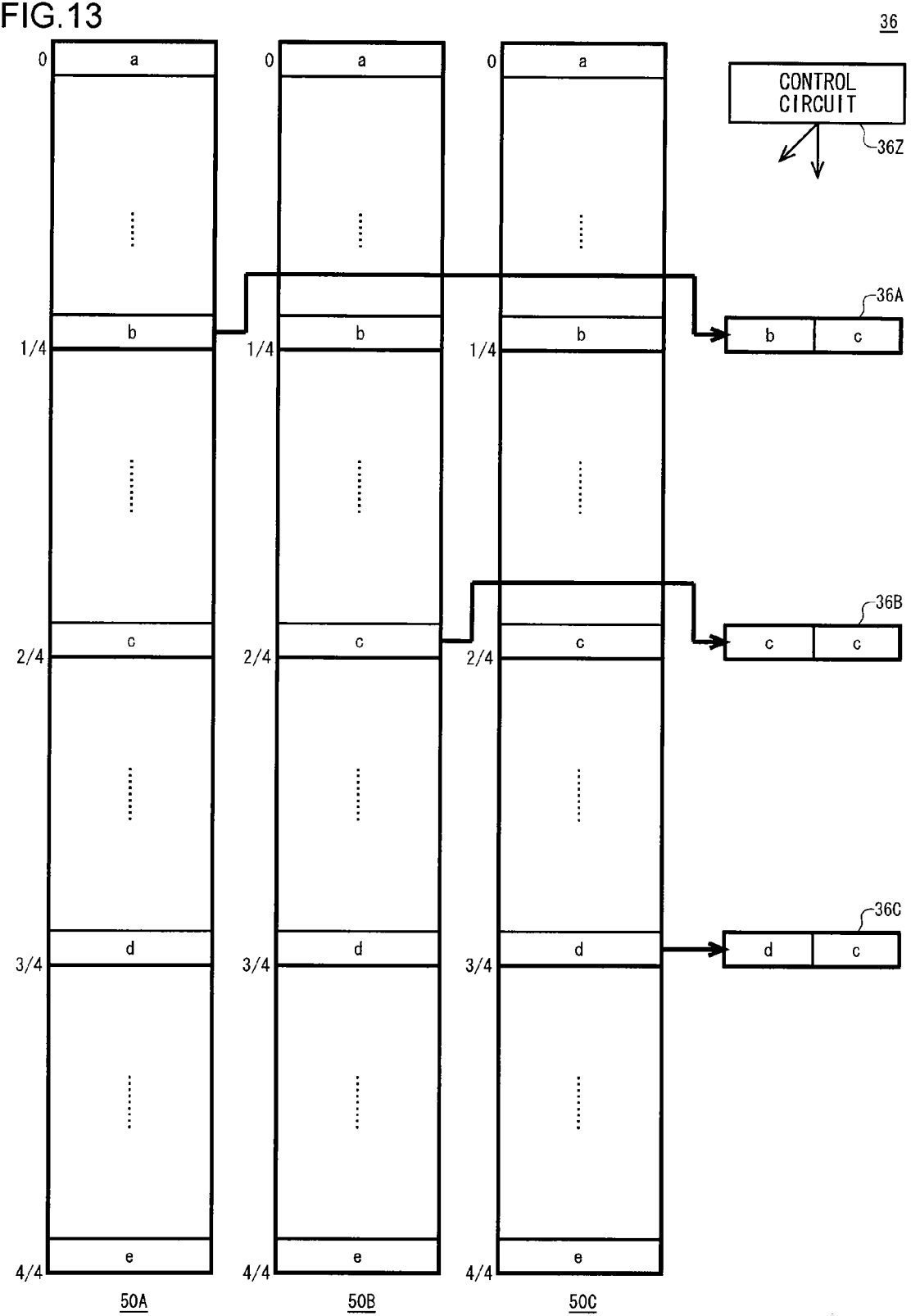
FIG. 13 is a diagram that shows a configuration of the binary search circuit.

FIG. 13 shows a configuration of the binary search circuit. The binary search circuit 36 includes comparison circuits 36A, 36B and 36C, each of which includes the 1024 comparators 36a, 36b, etc. as shown in FIG. 12, and a control circuit 36Z for controlling the comparison circuits.

In a conventional binary search method, a piece of data lying at the one-half position in the search range of a database, in which pieces of data are aligned in ascending or descending order, is read out to be compared with comparison target data in the first search. When the pieces of data are aligned in ascending order and if the comparison target data is smaller than the read out data, it means that the comparison target data might exist within the first half of the search range. Accordingly, in the second search, the search range is newly set to the first half and a piece of data lying at the one-half position in the range, i.e. at the one-quarter position in the original search range, is read out to be compared with the comparison target data. Conversely, if the comparison target data is greater than the read out data, it means that the comparison target data might exist within the second half of the search range. Accordingly, the new search range is set to the second half and a piece of data lying at the one-half position in the range, i.e. at the three-quarter position in the original search range, is read out to be compared with the comparison target data in the second search. In this way, the search range is narrowed by half repeatedly until the target data is reached.

In the base technology, in contrast, three comparison circuits are provided for binary search, so that when the data at the one-half position in the search range is compared with comparison target data for the first search, the comparison for the second search between the comparison target data and each of the pieces of data at the one-quarter and three-quarter positions in the search range can be simultaneously performed in parallel. Thus, the first and second searches can be performed at the same time, thereby reducing the time required to load the data from the database. Also, by operating three comparison circuits in parallel, the number of comparisons can be reduced by half, thereby reducing the search time.

In the example of FIG. 13, three comparison circuits are provided to perform two searches simultaneously. When n searches are to be performed simultaneously, $2^n-1$ comparison circuits may be generally provided. The control circuit 36Z inputs each piece of data at the $1/2^n$, $2/2^n$, ..., and $(2^n-1)/2^n$ positions in the search range into the $2^n-1$ comparison circuits respectively, and operates the comparison circuits simultaneously in parallel to allow them to compare the respective pieces of data with comparison target data. The control circuit 36Z then acquires the comparison results from the comparison circuits and determines if the comparison target data is found. If any of the comparison circuits output a signal indicating that there has been a data match, the control circuit 36Z will determine that the comparison target data has been found and will terminate the binary search. If there is no such signal output, the process will be shifted to the next search. If the comparison target data exists within the database, the data must lie within a range between points where the comparison results of the $2^n-1$ comparison circuits change. In the case where 15 comparison circuits are provided, for example, if the piece of data at the 5/16 position is smaller than comparison target data and if the piece of data at the 6/16 position is greater than the comparison target data, the comparison target data should lie within the range between the 5/16 and 6/16 positions. Thus, the control circuit 36Z acquires comparison results from the comparison circuits and sets the next search range to a range between points where the comparison results change. The control circuit 36Z then inputs, into the respective comparison circuits, each piece of data at the $1/2^n$, $2/2^n$, ..., and $(2^n-1)/2^n$ positions in the next search range thus set.

There are provided the three first databases 50 in the base technology: the first database 50A is connected to the comparison circuit 36A and supplies thereto a piece of data at the one-quarter position in the search range; the first database 50B is connected to the comparison circuit 36B and supplies thereto a piece of data at the two-quarter position in the search range; and the first database 50C is connected to the comparison circuit 36C and supplies thereto a piece of data at the three-quarter position in the search range. Therefore, pieces of data can be loaded simultaneously into the comparison circuits in parallel, thereby further reducing the time for data loading and enabling high-speed binary search.

Providing more comparison circuits will improve the search speed. In consideration of cost or size of the system, a sufficient number of comparison circuits may be provided to achieve a desired search speed. Also, although it is desirable that first databases as many as comparison circuits are provided, some comparison circuits may share a database in consideration of cost or size of the system.

FIG. 14 shows still yet another example of internal data of the first database. The first database 50 shown in FIG. 14 stores URLs of contents to which filtering is applied. The data stored in the first database 50 may include predetermined data recognized as a wild card, such as "00H" or "01H". In the example shown in FIG. 14, "*******" is recognized as a wild card in "http://www.xx.xx/*******", and, whatever the comparison target data corresponding thereto is, it is determined in the comparators 36a, 36b, etc. that such data matches the wild card. Accordingly, every character string starting with "http://www.xx.xx/" is detected by the binary search circuit 36. Consequently, processing such as applying filtering to all contents within the domain "http://www.xx.xx/" can be easily performed.

FIG. 15 shows an example of internal data of the second database. The second database 60 includes a search result field 62, which contains a search result of the search circuit 30, and a processing content field 64, which contains a processing content to be performed on communication data. The database stores the search results and the processing contents related to each other. In the example of FIG. 15, conditions are established such that a packet will be allowed to pass if its communication data contains reference data; if not, the packet will be discarded. The process execution circuit 40 searches the second database 60 for a processing content based on the search result and performs the processing on the communication data. The process execution circuit 40 may also be configured with a wired logic circuit.

FIG. 16 shows another example of internal data of the second database. In the example of FIG. 16, the processing content is set for each piece of reference data. With regard to packet replacement, replacement data may be stored in the second database 60. As for packet routing or switching, information on the route may be stored in the second database 60. The process execution circuit 40 performs processing, such as filtering, routing, switching, or replacement, which is specified in the second database 60, in accordance with the search result of the search circuit 30. When the processing content is set for each piece of reference data, as shown in FIG. 16, the first database 50 and the second database 60 may be merged with each other.

The first database and the second database are configured to be rewritable from the outside. By replacing these databases, various types of data processing and communication control can be achieved using the same communication control apparatus 10. Also, multistage search processing may be performed by providing two or more databases that store reference data to be searched. In such instance, more complicated conditional branching may be performed by providing two or more databases that store search results and processing contents related to each other. When multiple databases are thus provided to conduct multistage search, a plurality of the position detection circuits 32, the index circuits 34, the binary search circuits 36, etc. may also be provided.

The data intended for the foregoing comparison may be compressed by the same compression logic. If both the source data and the target data to be compared are compressed by the same method, the comparison can be performed in the same manner as usual, thus reducing the amount of data to be loaded for comparison. The smaller amount of data to be loaded can reduce the time required to read out the data from the memory, thereby reducing the overall processing time. Moreover, the number of comparators can be also reduced, which contributes to the miniaturization, weight saving, and cost reduction of the apparatus. The data intended for comparison may be stored in a compressed form, or may be read out from the memory and compressed before comparison.

Figure 17:
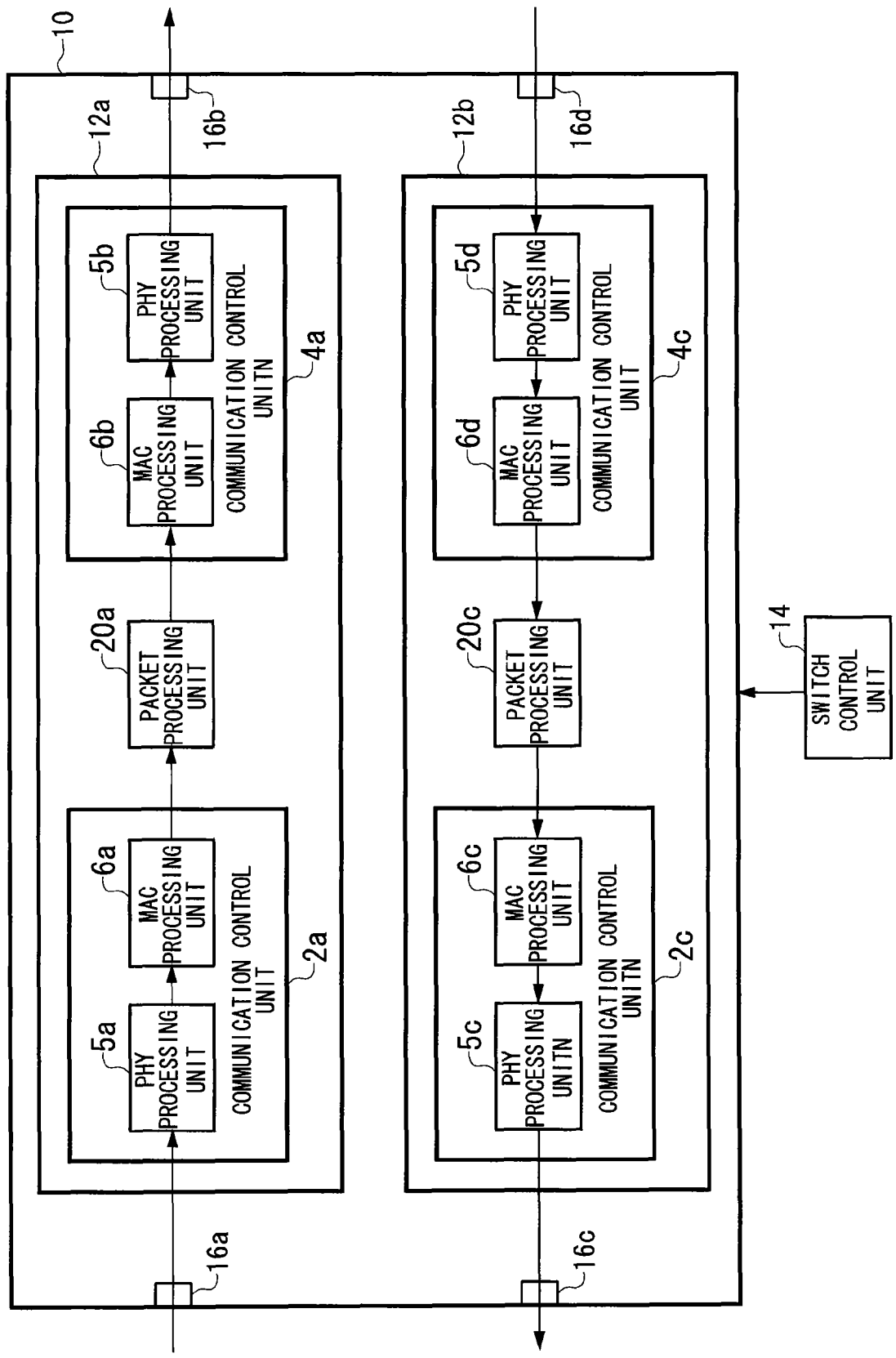
FIG. 17 is a diagram that shows another illustrative configuration of the communication control apparatus according to the base technology.

FIG. 17 shows another illustrative configuration of the communication control apparatus in the base technology. The communication control apparatus 10 shown in this diagram has two communication control units 12, each of which has the same configuration as the communication control apparatus 10 shown in FIG. 4. There is also provided a switch control unit 14 for controlling the operation of the individual communication control units 12. Each of the communication control units 12 has two input/output interfaces 16 and is connected to two networks, upstream and downstream, via the respective input/output interfaces 16. The communication control units 12 receive communication data from either one of the networks and output processed data to the other. The switch control unit 14 switches the inputs and outputs of the input/output interfaces 16 provided for the individual communication control units 12, thereby switching the directions of the flow of communication data in the communication control units 12. This allows communication control not only in one direction but also in both directions.

The switch control unit 14 may provide control such that: either one of the communication control units 12 processes inbound packets and the other processes outbound packets; both the units process inbound packets; or both the units process outbound packets. Consequently, the directions of communications to control can be changed depending on, for example, the traffic status or intended purpose.

The switch control unit 14 may acquire the operating state of the respective communication control units 12 and may switch the direction of communication control according thereto. For example, when one of the communication control units 12 is in a standby state and the other communication control unit 12 is in operation, the unit on standby may be activated as a substitute upon detection of the unit in operation stopping due to a failure or other reasons. This can improve the fault tolerance of the communication control apparatus 10. Also when one of the communication control units 12 needs maintenance such as a database update, the other communication control unit 12 may be operated as a substitute. Thus, appropriate maintenance can be performed without halting the operation of the communication control apparatus 10.

The communication control apparatus 10 may be provided with three or more communication control units 12. The switch control unit 14 may, for example, acquire the traffic status to control the direction of communications in the respective communication control units 12 so that more communication control units 12 are allocated for communication control processing in a direction handling higher traffic. This minimizes a drop in the communication speed, even when the traffic increases in one direction.

Embodiment

There will be described a technique for determining, at high speed, processing to be performed by the communication control apparatus 10 discussed above.

Figure 18:
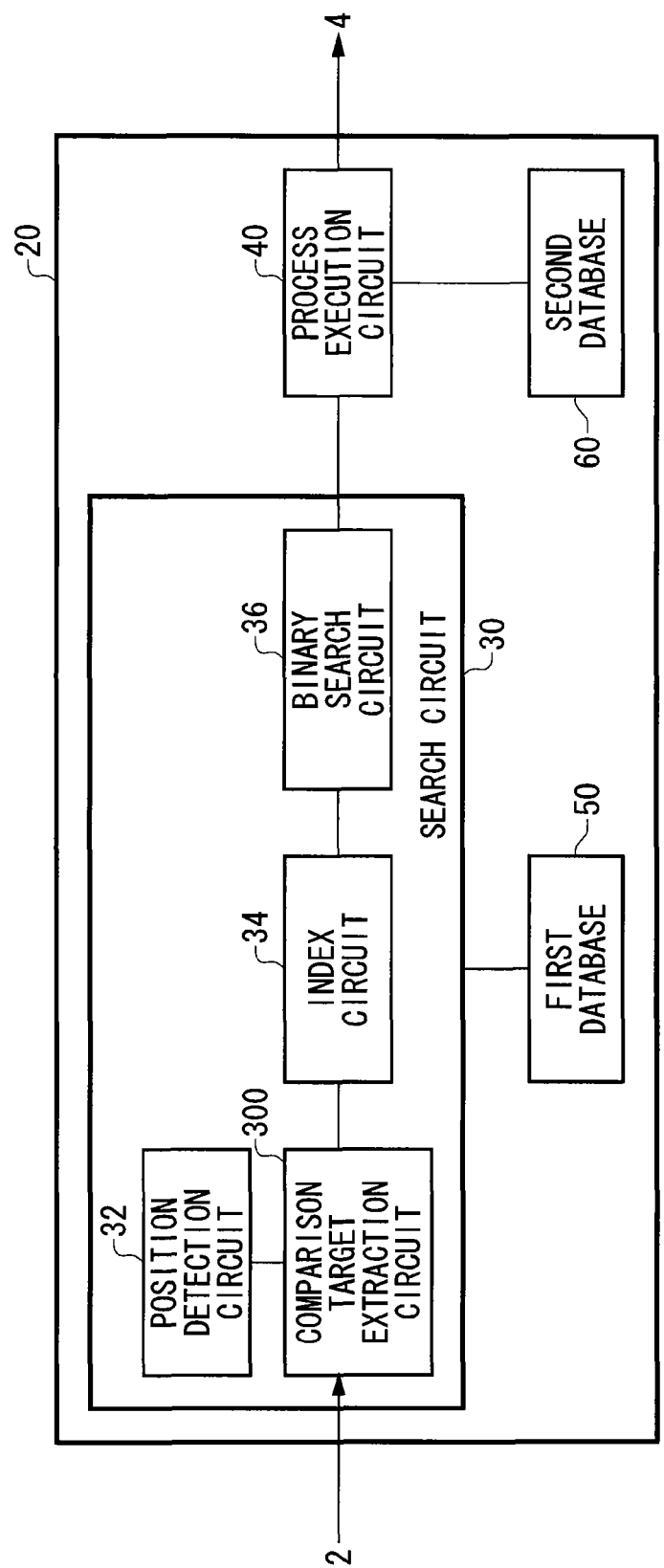
FIG. 18 is a diagram that shows a configuration of the packet processing circuit according to an embodiment.

FIG. 18 shows a configuration of the packet processing circuit 20 according to the embodiment. The packet processing circuit 20 shown in FIG. 18 is an example of the determination apparatus according to the present invention and comprises a comparison target extraction circuit 300 in addition to the configuration of the packet processing circuit 20 according to the base technology shown in FIG. 4. Other configurations and operations are the same as those in the base technology.

FIG. 19 shows an example of communication data acquired by the communication control apparatus 10. Communication data 310 contains data aligned according to a packet layout that depends on the type of the communication protocol. For the sake of convenience, data areas are numbered in FIG. 19. For example, data of which the data area is numbered "1" is described "Data 1".

Figure 20:
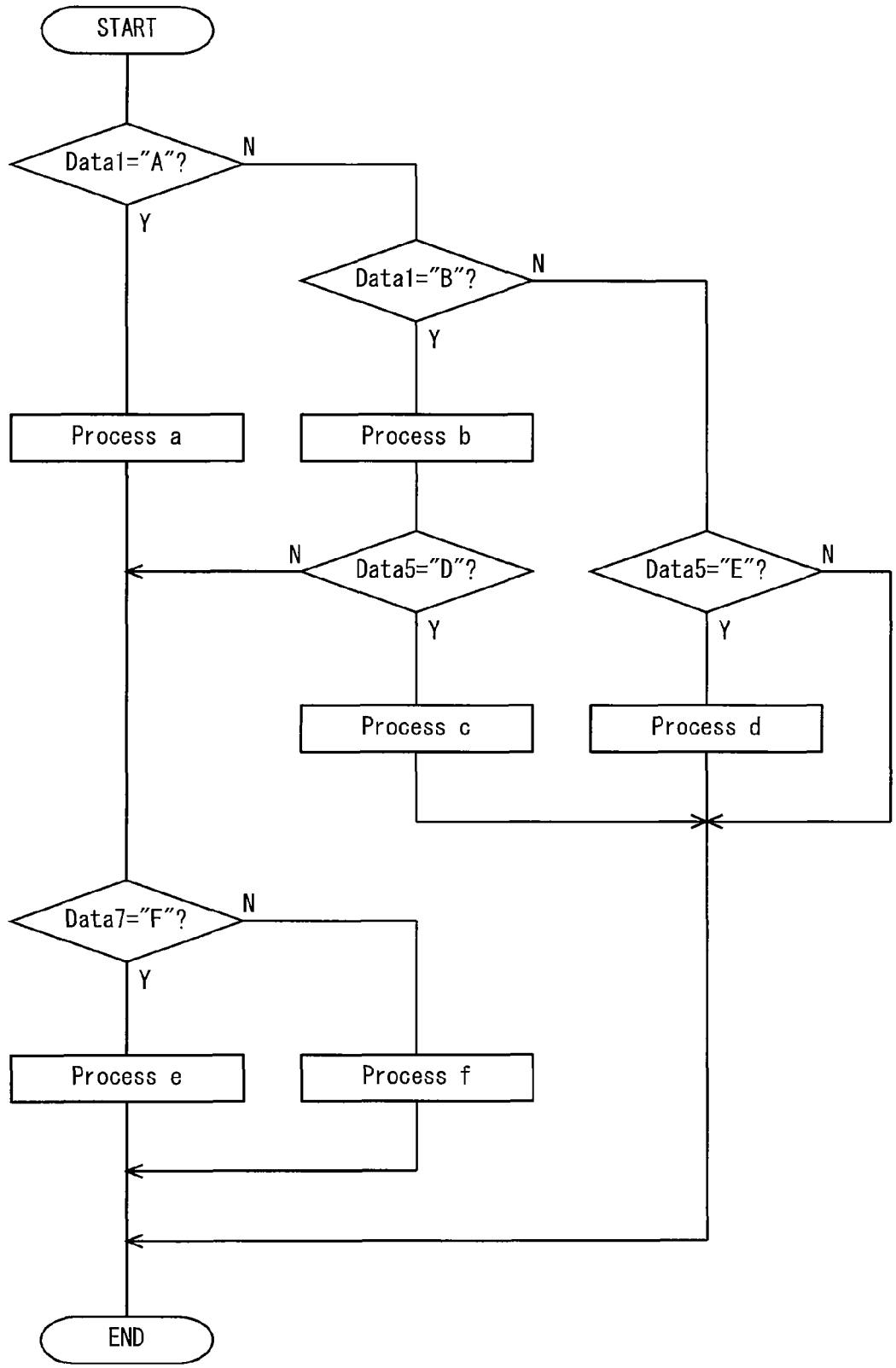
FIG. 20 is a diagram that shows an illustrative flowchart for determining processing to be performed by the communication control apparatus.

FIG. 20 shows an illustrative flowchart for determining processing to be performed by the communication control apparatus 10. In the example of FIG. 20, Data 1, Data 5, and Data 7 in the communication data 310 acquired by the communication control apparatus 10 are used as determination criteria, and multiple condition judgments and branches are conducted based on such data so as to determine processing to be performed. When a series of processes is performed according to this flowchart, two or three condition judgments and branches need be conducted.

Figure 21:
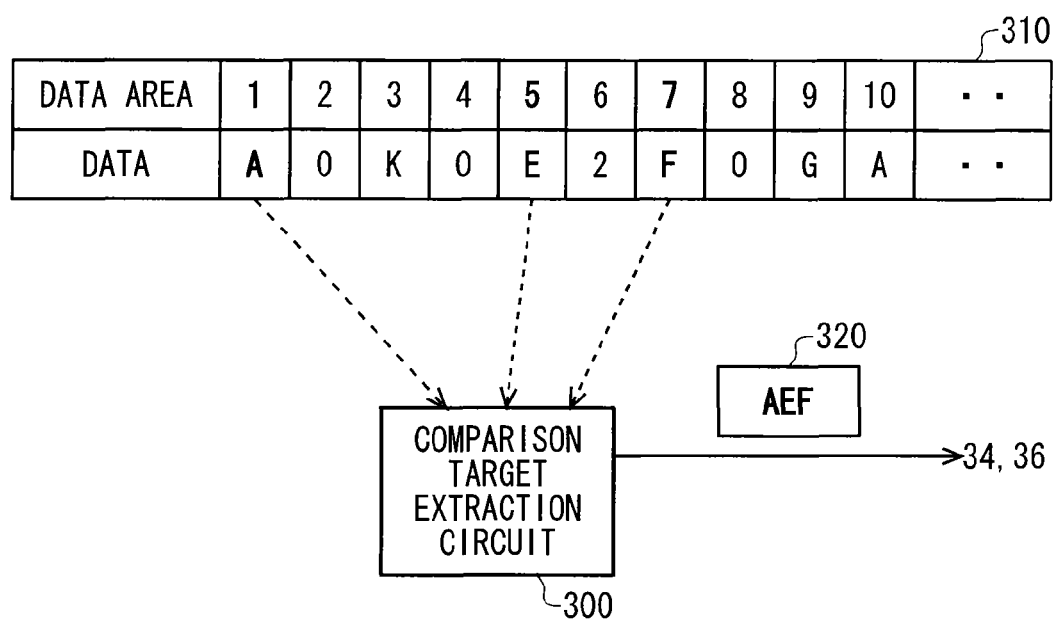
FIG. 21 is a diagram for describing a determination method according to the embodiment.

FIG. 21 is a diagram for describing a determination method according to the present embodiment. The comparison target extraction circuit 300 extracts, from communication data 310 acquired by the communication control apparatus 10, multiple pieces of determination data, which are used to determine processing to be performed, and connects such pieces so as to generate comparison target data 320. In the example according to the flowchart shown in FIG. 20, "A" of Data 1, "E" of Data 5, and "F" of Data 7 are extracted from the communication data 310 and connected with each other, so that "AEF" is generated as the comparison target data 320. The comparison target extraction circuit 300 then provides the comparison target data 320 thus generated to the index circuit 34 and binary search circuit 36. When extracting determination data from the communication data 310, the comparison target extraction circuit 300 may detect the position of the determination data using the position detection circuit 32.

FIG. 22 shows an example of internal data of the first database 50 and second database 60 according to the present embodiment. The first database 50 stores reference data that is generated by connecting a possible value of each of Data 1, Data 5, and Data 7. The second database 60 stores a processing content to be performed, which is determined through multiple condition judgments and branches based on a combination of the values of Data 1, Data 5, and Data 7 according to the flowchart of FIG. 20 and which is related to reference data. For example, if the combination is "A" of Data 1, "E" of Data 5, and "F" of Data 7, the reference data will be "AEF" and the processing content to be performed will be "Process a and Process e", as can be confirmed in the flowchart of FIG. 20. The binary search circuit 36 collectively conducts multiple condition judgments and branches by searching the first database 50 for comparison target data 320 generated by the comparison target extraction circuit 300, and outputs a processing content to be performed related to reference data that matches the comparison target data. The process execution circuit 40 then performs the processing content thus determined by the search circuit 30.

In this way, pieces of data that serve as determination criteria are extracted from communication data and connected with each other so as to generate comparison target data, and a database storing pieces of comparison target data expected to be generated is also prepared in advance, so that multiple condition judgments and branches for determining processing to be performed can be collectively conducted instead of being sequentially conducted. Thus, processing to be performed can be determined at high speed.

Also, the logic including multiple condition judgments and branches can be replaced by data, so that, when the logic is changed, only the first database 50 or second database 60 may be changed instead of the whole software being changed. Accordingly, man-hours can be reduced.

Figure 23:
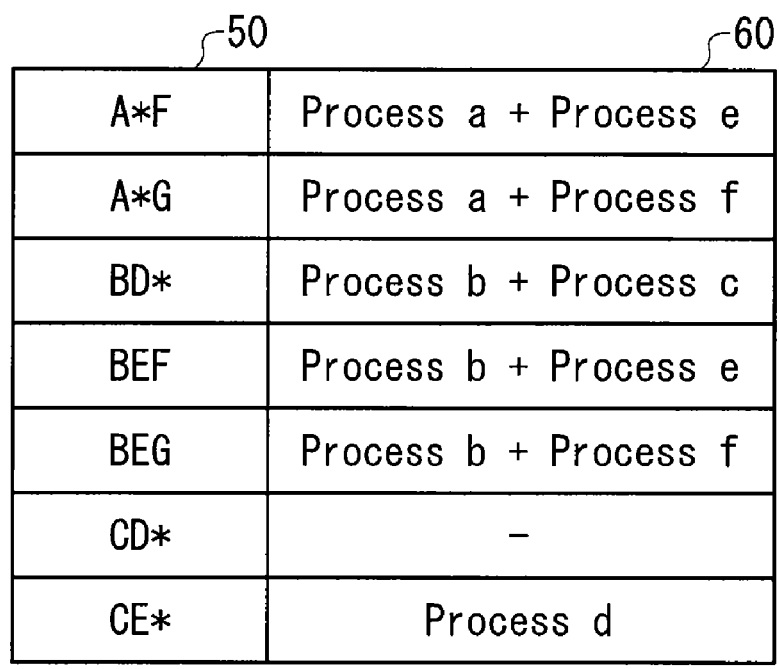
FIG. 23 is a diagram that shows another example of internal data of the first database and second database according to the embodiment.

FIG. 23 shows another example of internal data of the first database 50 and second database 60 according to the present embodiment. In the example of FIG. 23, when there is a piece of determination data that is not used in multiple condition judgments and branches within the combination of the values of multiple pieces of determination data included in reference data, such piece of determination data is masked therein. For example, if Data 1 is "A" in the flowchart shown in FIG. 20, the condition judgment and branch with respect to Data 5 need not be conducted, and hence, the result will be the same whatever Data 5 is. Accordingly, within reference data that contains "A" as Data 1, a wild card is provided as Data 5.

When data are compared in which such mask is set, the data values at masked positions in both comparison target data and reference data may be replaced with a certain data value, such as "zero", before the data are input to comparison circuits, as described in the base technology, or a comparison circuit that handles the data value at a masked position may be allowed to output an output signal indicating that compared values have matched. Alternatively, an output signal indicating that compared values have matched may be provided as the comparison result with respect to the data value at a masked position without the involvement of a comparison circuit, or a circuit that acquires an output signal from each of the comparison circuits to determine a comparison result may ignore a comparison result with respect to the data value at a masked position.

By employing such configuration, the capacity of the first database 50 can be reduced, and the efficiency of comparison processing can be improved.

Figure 24:
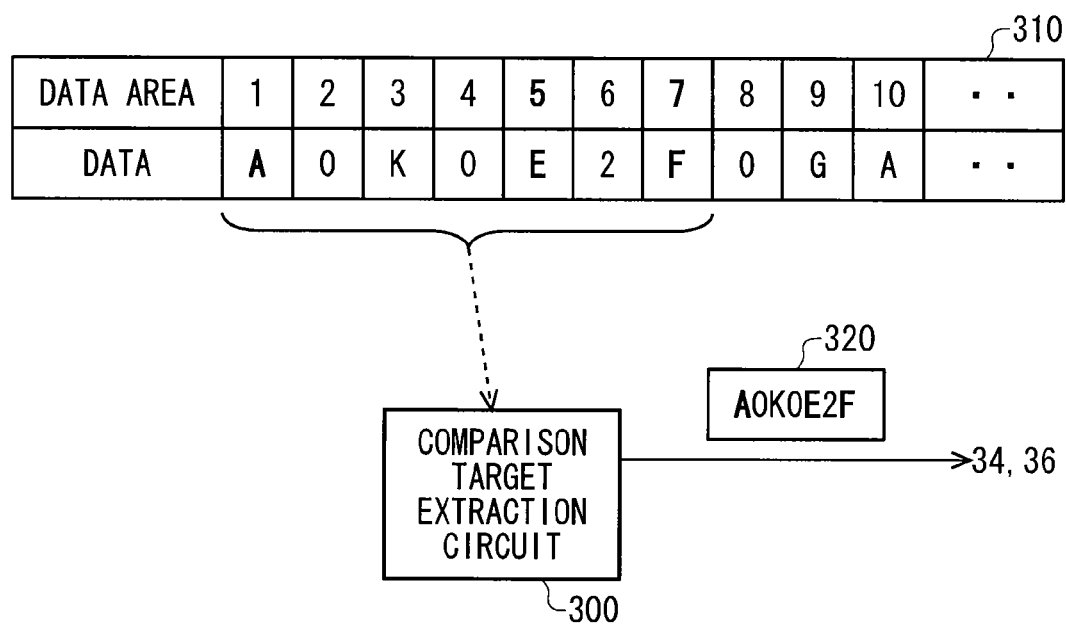
FIG. 24 is a diagram for describing another illustrative determination method according to the embodiment.

FIG. 24 is a diagram for describing another illustrative determination method according to the present embodiment. The comparison target extraction circuit 300 extracts, from communication data 310, comparison target data of a certain length starting from a certain position, which is predefined so as to include multiple pieces of determination data used for condition judgments and branches. In the example of FIG. 24, the data from Data 1 through Data 7 is extracted as comparison target data so as to include determination data of Data 1, Data 5, and Data 7. In this case, the first database 50 stores reference data of a data length identical with that of the comparison target data, as shown in FIG. 25.

Figure 25:
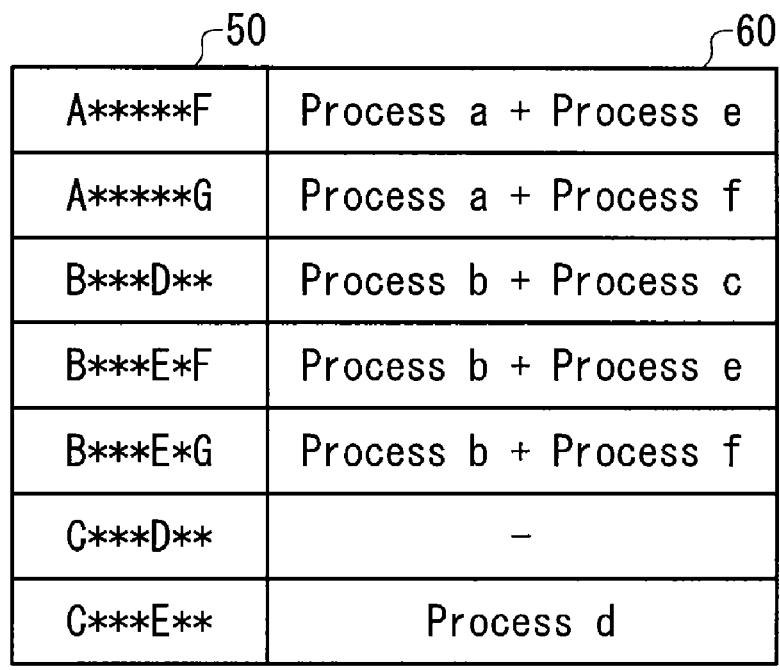
FIG. 25 is a diagram that shows yet another example of internal data of the first database and second database according to the embodiment.

FIG. 25 shows yet another example of internal data of the first database 50 and second database 60 according to the present embodiment. In the example of FIG. 25, reference data stored includes pieces of data that are not used as determination data. Reference data in the first database 50 has a data length identical with that of the data from Data 1 through Data 7, which is extracted as comparison target data. At the position of each piece of determination data in reference data is provided a possible value of the piece of determination data. At the positions other than those of determination data, wild cards are provided.

The index circuit 34 and binary search circuit 36 search the database for comparison target data in which each piece of data other than multiple pieces of determination data is masked. Accordingly, multiple condition judgments and branches can be collectively conducted, and a processing content to be performed related to reference data that matches the comparison target data can be determined at high speed.

Figure 26:
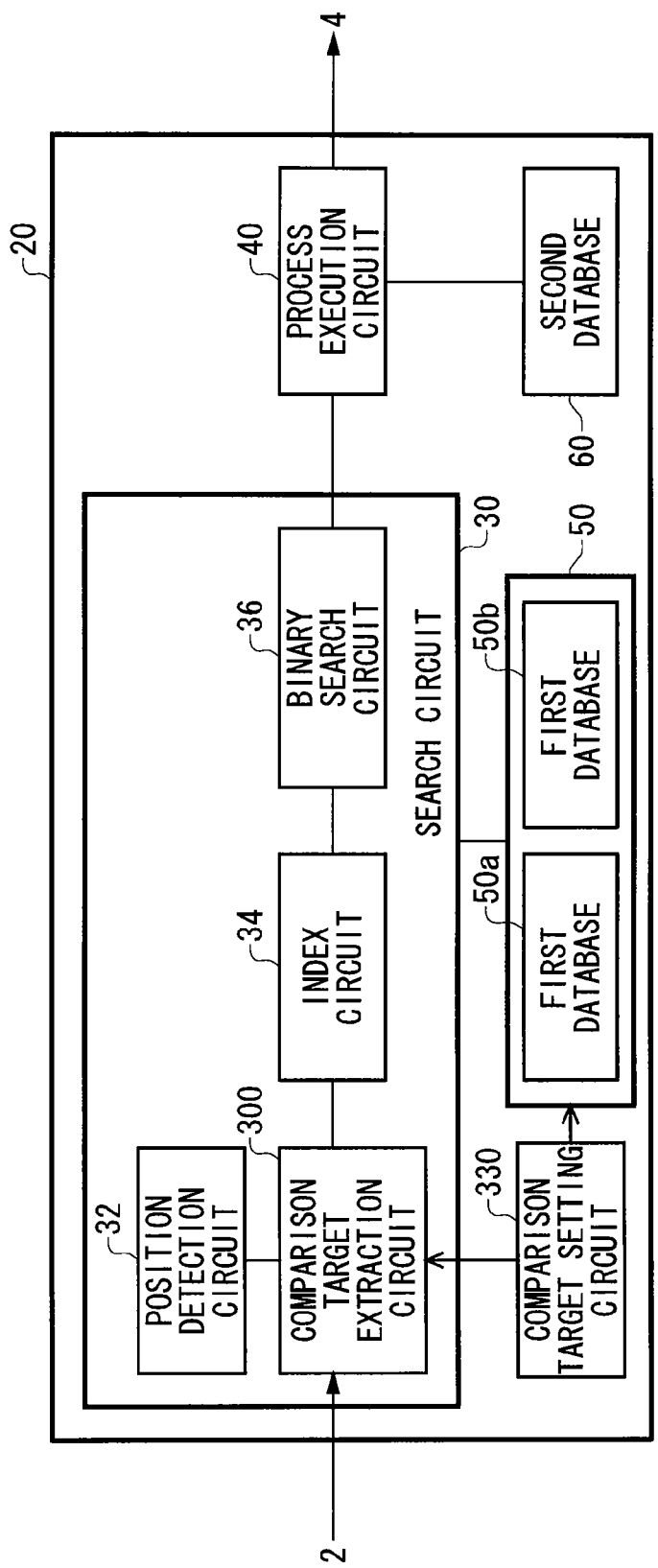
FIG. 26 is a diagram that shows another illustrative configuration of the packet processing circuit according to the embodiment.

FIG. 26 shows another illustrative configuration of the packet processing circuit 20 according to the embodiment. The packet processing circuit 20 shown in FIG. 26 comprises a comparison target setting circuit 330 in addition to the configuration of the packet processing circuit 20 shown in FIG. 18 and comprises multiple first databases 50a and 50b. The comparison target setting circuit 330 specifies data to be extracted by the comparison target extraction circuit 300. The comparison target extraction circuit 300 extracts data specified by the comparison target setting circuit 330 to generate comparison target data. Other configurations and operations are the same as those of the packet processing circuit 20 shown in FIG. 18.

Figure 27:
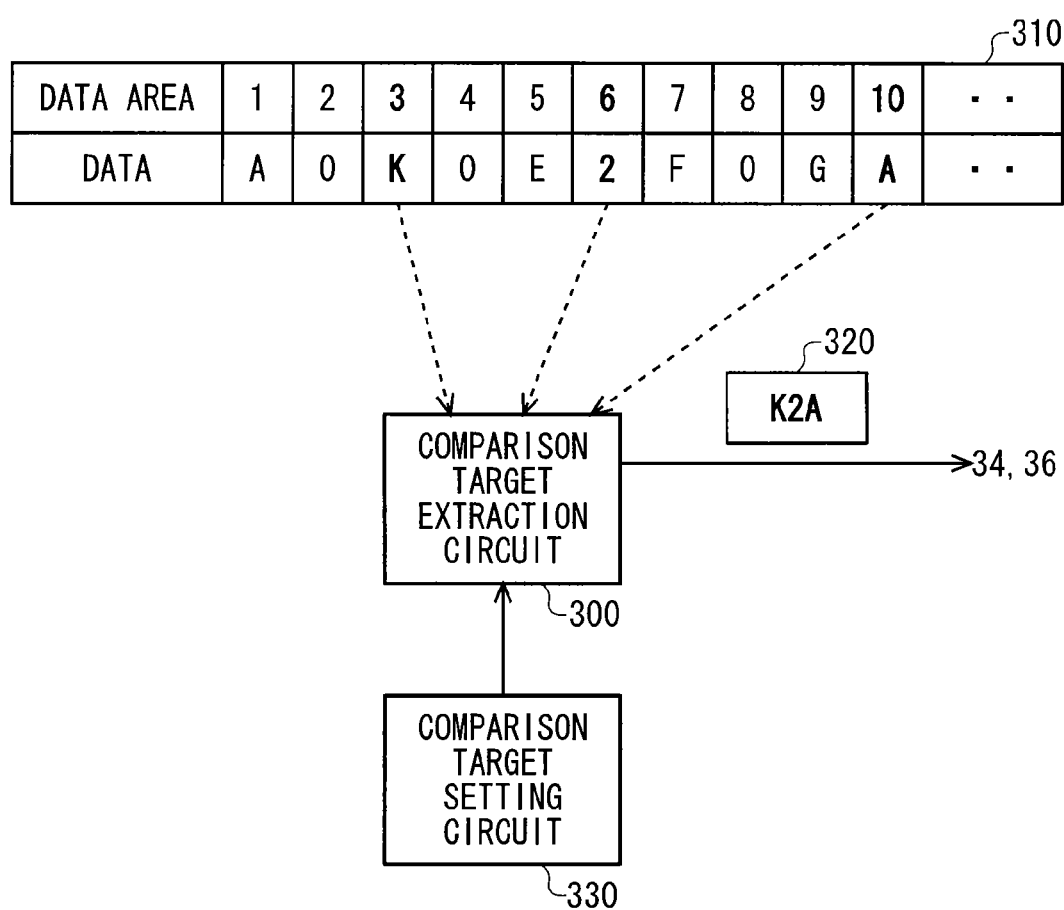
FIG. 27 is a diagram for describing yet another illustrative determination method according to the embodiment.

FIG. 27 is a diagram for describing yet another illustrative determination method according to the present embodiment. In the example of FIG. 27, the comparison target setting circuit 330 sets that Data 3, Data 6, and Data 10 are extracted instead of Data 1, Data 5, and Data 7. According to the setting, the comparison target extraction circuit 300 extracts Data 3, Data 6, and Data 10 from the communication data 310 to generate comparison target data 320. Thus, pieces of determination data extracted as comparison target data may be arbitrarily specified. By replacing reference data in the first database 50 in response to the setting change, the logic for determining processing to be performed can be easily changed.

The comparison target setting circuit 330 may dynamically change the data to be extracted by the comparison target extraction circuit 300. In this case, the comparison target setting circuit 330 may dynamically replace the first database 50 to be applied. Accordingly, by dynamically changing both the comparison target data and reference data, processing to be performed can be determined according to different logics. For instance, processes using multiple different communication protocols can be performed by a single communication control apparatus 10, or filtering processing according to settings provided by multiple users can be performed.

Figure 28:
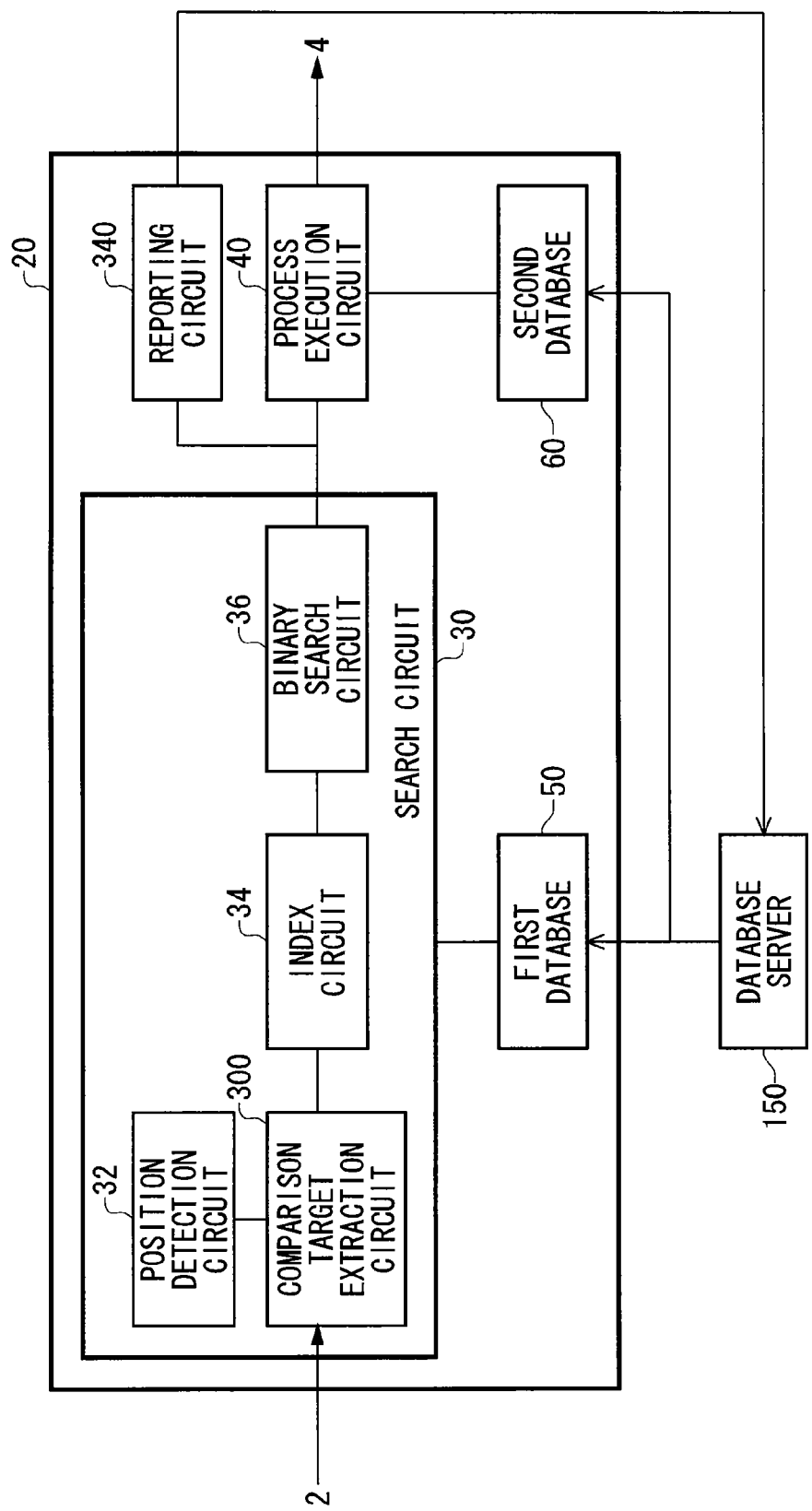
FIG. 28 is a diagram that shows yet another illustrative configuration of the packet processing circuit according to the embodiment.

FIG. 28 shows yet another illustrative configuration of the packet processing circuit 20 according to the embodiment. The packet processing circuit 20 shown in FIG. 28 comprises a reporting circuit 340 in addition to the configuration of the packet processing circuit 20 shown in FIG. 18. When comparison target data does not match any reference data in the first database 50, the reporting circuit 340 reports it to an external apparatus. Other configurations and operations are the same as those of the packet processing circuit 20 shown in FIG. 18.

If comparison target data does not match any reference data in the first database 50, it means that there is a defect in the logic for determining processing to be performed. Accordingly, by allowing the reporting circuit 340 to report the defect in such case, the first database 50 and second database 60 can be appropriately modified so that the defect in the logic is corrected. In the example of FIG. 28, the reporting circuit 340 reports, to the database server 150, comparison target data that has not matched any reference data in the first database 50. The database server 150 then receives from an operator or the like a processing content to be performed on the comparison target data, adds to the first database 50 a record of reference data identical with the comparison target data, and stores in the second database 60 the received processing content so as to be related to the reference data. Thereafter, the database server 150 provides the modified first database 50 and second database 60 back to the communication control apparatus 10, so as to reflect the modifications of the databases.

The present invention has been described with reference to the embodiment. The embodiment is intended to be illustrative only and it will be obvious to those skilled in the art that various modifications to constituting elements or processes could be developed and that such modifications are also within the scope of the present invention.

INDUSTRIAL APPLICABILITY

The present invention is applicable to a determination circuit for determining processing to be performed.

The invention claimed is:

1. A determination apparatus, comprising:
a comparison target extraction circuit which, when processing to be performed is determined through a plurality of condition judgments and branches, extracts from acquired data a plurality of pieces of determination data used for the condition judgments and branches and connects the plurality of pieces of determination data to generate comparison target data;

a database which stores reference data generated by connecting a possible value of each of the plurality of pieces of determination data and also stores a processing content to be performed determined through the plurality of condition judgments and branches based on the combination of the values of the plurality of pieces of determination data included in the reference data, the reference data and the processing content being related to each other; and a search circuit which collectively conducts the plurality of condition judgments and branches at a time by searching the database for the comparison target data and which outputs a processing content to be performed related to the reference data that matches the comparison target data.

2. The determination apparatus of claim 1, wherein, when there is a piece of determination data that is not used in the plurality of condition judgments and branches within the combination of the values of the plurality of pieces of determination data included in reference data, the piece of determination data is masked therein.

3. The determination apparatus of, claim 1 further comprising a comparison target setting circuit which specifies a plurality of pieces of determination data to be extracted by the comparison target extraction circuit.

4. The determination apparatus of claim 3 comprising a plurality of the databases, wherein, when changing a plurality of pieces of determination data to be extracted by the comparison target extraction circuit, the comparison target setting circuit also replaces the database searched by the search circuit accordingly.

5. The determination apparatus of, claim 1 further comprising a reporting circuit which, when the comparison target data does not match any of the reference data, reports the fact.

6. The determination apparatus of claim 5, wherein the database is configured to be updatable from the outside so as to be replaced by a new database in which is added a record in regard to comparison target data that has not matched any of the reference data.

7. A determination method, comprising:
extracting, when processing to be performed is determined through a plurality of condition judgments and branches, a plurality of pieces of determination data used for the condition judgments and branches from acquired data and connecting the plurality of pieces of determination data to generate comparison target data; and collectively conducting the plurality of condition judgments and branches at a time by searching for the comparison target data within a database, which stores reference data generated by connecting a possible value of each of the plurality of pieces of determination data and also stores a processing content to be performed determined through the plurality of condition judgments and branches based on the combination of the values of the plurality of pieces of determination data included in the reference data, the reference data and the processing content being related to each other, and outputting a processing content to be performed related to the reference data that matches the comparison target data.

8. The determination method of claim 7, wherein, when there is a piece of determination data that is not used in the plurality of condition judgments and branches within the combination of the values of the plurality of pieces of determination data included in reference data, the piece of determination data is masked therein.

9. The determination method of, claim 7 further comprising specifying a plurality of pieces of determination data to be extracted in the extracting.

10. The determination method of claim 9, wherein, in the case where a plurality of the databases are provided and when a plurality of pieces of determination data to be extracted in the extracting are changed, a database to be searched is also replaced in the specifying accordingly.

11. The determination method of, claim 7 further comprising reporting, when the comparison target data does not match any of the reference data, the fact.

12. The determination method of claim 11, further comprising generating, when it is reported that the comparison target data has not matched any of the reference data, a new database in which is added a record in regard to such comparison target data, so as to update the database.

* * * * *